(12) United States Patent
van der Mee et al.

(10) Patent No.: US 9,365,720 B2
(45) Date of Patent: Jun. 14, 2016

(54) INTERIOR TRAIN COMPONENTS HAVING LOW SMOKE AND LOW HEAT RELEASE, AND METHODS OF THEIR MANUFACTURE

(71) Applicant: SABIC INNOVATIVE PLASTICS IP B.V., Bergen op Zoom (NL)

(72) Inventors: Mark Adrianus Johannes van der Mee, Breda (NL); Remco Wirtz, Begen op Zoom (NL); Roland Sebastian Assink, Middelburg (NL); Robert Dirk van de Grampel, Tholen (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 60 days.

(21) Appl. No.: 14/154,583

(22) Filed: Jan. 14, 2014

(65) Prior Publication Data
US 2015/0197633 A1 Jul. 16, 2015

(51) Int. Cl.
*C08L 83/10* (2006.01)
*C08L 69/00* (2006.01)
*C08L 51/08* (2006.01)
*C08L 81/00* (2006.01)
*C08L 81/04* (2006.01)
*C08L 81/10* (2006.01)

(52) U.S. Cl.
CPC ............ *C08L 83/10* (2013.01); *C08L 51/085* (2013.01); *C08L 69/00* (2013.01); *C08L 69/005* (2013.01); *C08L 81/00* (2013.01); *C08L 81/04* (2013.01); *C08L 81/10* (2013.01); *C08L 2205/02* (2013.01); *C08L 2205/025* (2013.01)

(58) Field of Classification Search
CPC ......... C08K 7/14; C08L 69/00; C08L 69/005; C08L 83/10; C08L 2205/02; C08L 2205/025
See application file for complete search history.

(56) References Cited

U.S. PATENT DOCUMENTS

| | | | |
|---|---|---|---|
| 6,399,198 B1 * | 6/2002 | Miller | C03C 25/101 427/174 |
| 6,723,864 B2 | 4/2004 | Silva et al. | |
| 7,232,854 B2 | 6/2007 | Ma et al. | |
| 7,498,401 B2 | 3/2009 | Agarwal | |
| 7,615,594 B2 | 11/2009 | Hashimoto et al. | |
| 7,790,292 B2 | 9/2010 | Colborn et al. | |
| 7,994,239 B2 | 8/2011 | Mukawa et al. | |
| 8,362,114 B2 | 1/2013 | Maljkovic et al. | |
| 2004/0039145 A1 | 2/2004 | Silva et al. | |
| 2004/0220330 A1 * | 11/2004 | DeRudder | C08G 64/186 524/837 |
| 2007/0149661 A1 | 6/2007 | Charati et al. | |
| 2007/0191518 A1 | 8/2007 | Chen et al. | |
| 2009/0306258 A1 * | 12/2009 | Siripurapu | C08L 69/00 524/147 |
| 2010/0075125 A1 | 3/2010 | Maas et al. | |
| 2012/0251750 A1 | 10/2012 | Sybert et al. | |
| 2013/0131241 A1 | 5/2013 | Van De Grampel et al. | |

FOREIGN PATENT DOCUMENTS

| | | |
|---|---|---|
| CN | 101962472 A | 2/2011 |
| EP | 2634219 A1 | 9/2013 |
| WO | 2013170456 A1 | 11/2013 |

OTHER PUBLICATIONS

Ho, K.C., et al.; Journal of Reinforced Plastics and Composites, 1997, p. 903-925.*
International Search Report for International Application No. PCT/IB2015/050287, International Application Filing Date Jan. 14, 2015, Date of Mailing Apr. 13, 2015, 4 pages.
Written Opinion for International Application No. PCT/IB2015/050287, International Application Filing Date Jan. 14, 2015, Date of Mailing Apr. 13, 2015, 6 pages.
Abele et al., "Silicone Based Flame Retardant for Polycarbonate", ANTEC, 2009, pp. 1351-1354.
Dibenedetto, A.T., "Tailoring of interfaces in glass fiber reinforced polymer composites: a review", Materials Science and Engineering: A, vol. 302, Issue 1, 2001, pp. 74-82.

* cited by examiner

*Primary Examiner* — Robert Jones, Jr.
(74) *Attorney, Agent, or Firm* — Cantor Colburn LLP

(57) ABSTRACT

A railway component comprises a polycarbonate composition comprising: a first polycarbonate selected from a linear polycarbonate homopolymer, a branched polycarbonate, a poly(carbonate-bisphenol arylate ester), a poly(aliphatic ester-carbonate), or a combination thereof; a second polymer different from the first polycarbonate, the second polymer comprising a poly(carbonate-siloxane) copolymer, a polydialkylsiloxane, a silicone graft copolymer, or a combination thereof, wherein siloxane units in the second polymer are present in an amount of 0.3 to 3 wt. %, based on the total weight of the composition; and 10 to 40 wt. % of glass fiber, based on the total weight of the polycarbonate composition.

53 Claims, 1 Drawing Sheet

INTERIOR TRAIN COMPONENTS HAVING LOW SMOKE AND LOW HEAT RELEASE, AND METHODS OF THEIR MANUFACTURE

BACKGROUND

This disclosure is directed to components for the interior of trains, and in particular seat components and claddings having low smoke density and low heat release.

Standards for flame retardancy properties such as flame spread, heat release, and smoke generation upon burning have become increasingly stringent for articles used in mass transportation such as trains. The European Union has approved the introduction of a new harmonized fire standard for rail applications, namely EN-45545, to replace all currently active different standards in each member state. This standard imposes stringent requirements on heat release, smoke density, and toxicity and flame spread properties allowed for materials used in these applications. Smoke density (Ds-4) in EN-45545 is the smoke density after four minutes measured according to ISO 5659-2, and heat release in EN-45545 is the maximum average rate of heat emission (MAHRE) measured according to ISO5660-1 and flame spread in EN-45545 is the critical heat flux at extinguishment (CFE) measured according to ISO 5658-2.

"Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g. in underground rail cars). For each application type, different test requirements for the hazard levels are defined.

For R6 applications, covering seat components, requirements on smoke density after four minutes measured according to ISO 5659-2 (Ds-4) are Ds-4 values at or below 300 measured at 50 kW/m$^2$ for HL2 and at or below 150 measured at 50 kW/m$^2$ for HL3. Requirements on the maximum average rate of heat emission (MAHRE) measured according to ISO5660-1 are at or below 90 kW/m$^2$ determined at 50 kW/m$^2$ for HL2 and at or below 60 kW/m$^2$ determined at 50 kW/m$^2$ for HL3. For R6 applications, no requirements on flame spread measured according to ISO 5658-2 exist.

Typical applications falling under R1 applications include interior vertical surfaces, such as side walls, front walls, endwalls, partitions, room dividers, flaps, boxes, hoods and louvres; interior doors and linings for internal and external doors; window insulations, kitchen interior surfaces, interior horizontal surfaces, such as ceiling paneling, flaps, boxes, hoods and louvres; luggage storage areas, such as overhead and vertical luggage racks, luggage containers and compartments; driver's desk applications, such as paneling and surfaces of driver's desk; interior surfaces of gangways, such as interior sides of gangway membranes (bellows) and interior linings; window frames (including sealants and gaskets); (folding) tables with downward facing surface; interior and exterior surface of air ducts, and devices for passenger information (such as information display screens). For R1 applications, requirements on smoke density after four minutes measured according to ISO 5659-2 (Ds-4) are Ds-4 values at or below 300 measured at 50 kW/m$^2$ for HL2 and at or below 150 measured at 50 kW/m$^2$ for HL3. Requirements on the maximum average rate of heat emission (MAHRE) measured according to ISO5660-1 are at or below 90 kW/m$^2$ determined at 50 kW/m$^2$ for HL2 and at or below 60 kW/m$^2$ determined at 50 kW/m$^2$ for HL3. Requirements on the critical heat flux at extinguishment (CFE) measured according to ISO 5658-2 are at or above 20 kW/m$^2$ for both HL2 and HL3.

It is exceptionally challenging to manufacture interior articles for trains that meet stringent smoke density standards, heat release standards and/or flame spread standards in addition to other material requirements. It is particularly challenging manufacture articles that meet these standards and that have good mechanical properties, including high stiffness, high strength, good impact, and good processability. Accordingly there remains a need for interior articles for trains, and in particular seat components and claddings that have a combination of low smoke, low heat release, and low flame spread properties. It would be a further advantage if the articles could be rendered low smoke and low heat release without a significant detrimental effect on one or more of material cost, manufacturing ease, and mechanical properties. It would be a still further advantage if the materials could be readily thermoformed or injection molded. It would be a still further advantage if such materials were in compliance with European Railway standard EN-45545, for example, without having a detrimental effect on material cost, ease of manufacture, and mechanical properties.

SUMMARY

In an embodiment, a railway component, wherein the component is a molded or extruded interior train component comprises a polycarbonate composition comprising: a first polycarbonate selected from a linear polycarbonate homopolymer, a branched polycarbonate, a poly(carbonate-bisphenol arylate ester), a poly(aliphatic ester-carbonate), or a combination comprising at least one of the foregoing; a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the polycarbonate composition in an amount of 0.3 to 3 wt. %, based on the total weight of the polycarbonate composition; and 10 to 50 wt. % of glass fiber, based on the total weight of the polycarbonate composition; wherein a sample of the polycarbonate composition has: a smoke density after 4 minutes (DS-4) of less than or equal to 300 determined according to ISO 5659-2 on a 3 mm thick plaque at 50 kW/m$^2$, and a maximum average heat release (MAHRE) of equal to or less than 90 kW/m$^2$ measured according to ISO 5660-1 on a 3 mm thick plaque at 50 kW/m$^2$.

In another embodiment, a railway component, wherein the component is a molded or extruded interior train component comprising a polycarbonate composition comprises: a first polycarbonate selected from a linear polycarbonate homopolymer, a branched polycarbonate, a poly(carbonate-bisphenol arylate ester), or a combination comprising at least one of the foregoing; a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the composition in an amount of 0.3 to 3 wt. %, based on the total weight of the composition; and 10 to 50 wt. % of glass fiber, based on the total weight of the composition; wherein a sample of the polycarbonate composition has: a smoke density after 1.5 min (Ds 1.5) of less than or equal to 100 measured according to ASTM E662-12 in flaming and in non-flaming mode on a 3 mm thick plaque, smoke density after 4 min (Ds4) of less than or equal to 200 measured according to ASTM E662-12 in flaming and non-flaming mode on a 3 mm thick plaque, and a maximum flame spread index (Is) of 35 and less, without flaming running or dripping measured according to ASTM E162-12a on a 3 mm thick plaque.

In yet another embodiment, a method of manufacture of the railway component comprises molding or extruding the above-described compositions to form the component.

The above described and other features are exemplified by the following Figures, Detailed Description, and Examples.

BRIEF DESCRIPTION OF THE DRAWINGS

A description of the figures, which are meant to be exemplary and not limiting, is provided in which.

Figure 1:
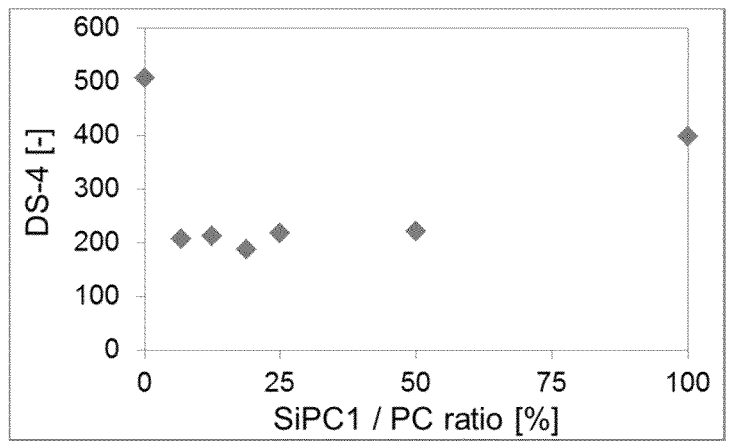
FIG. 1 shows the effect of increasing SiPC1/PC1 ratio on smoke density (Ds-4) for a composition containing 15% glass fiber.

The above described and other features are exemplified by the following detailed description and Examples.

DETAILED DESCRIPTION

The inventors hereof have developed interior train components. These components have low smoke density characteristics, in particular Ds-4 measured according to ISO5659-2, and low heat release characteristics, in particular improved MAHRE measured according to ISO5660-1, and can unexpectedly be obtained by use of preferred polycarbonate compositions. Thus, it has been discovered that the addition of a small amount of poly(carbonate-siloxane) copolymer, a polydialkylsiloxane, a silicone graft copolymer, or a combination comprising at least one of the foregoing to compositions comprising glass fiber and linear or branched polycarbonate homopolymers and/or polycarbonate copolymers with inherently high smoke has a highly positive effect on the smoke density and the heat release properties of these compositions.

The results are surprising because typical flame retardants used in polycarbonate compositions, for example, sulphonated flame retardant salts, phosphates and brominated flame retardants, do not have such a positive effect on smoke density or heat release. Furthermore, the positive effect is only obtained when the siloxane unit type is aliphatic, and not when it is aromatic. This is contradictory to commonly applied flame retardant approaches in polycarbonate for UL performance, where typically sulphonated salts, phosphates, brominated flame retardants, or aromatic siloxanes, such as polymethylphenylsiloxane or octaphenylcyclotretrasiloxane, rather than aliphatic siloxanes are used.

Applicants have also found that the presence of glass fiber in the composition further reduces smoke density. For example, the addition of poly(carbonate-siloxane) copolymer to a polycarbonate homopolymer results in an improvement in smoke density, but not to the required thresholds to meet EN 45545 requirements for R1 or R6 applications. However, the addition of poly(carbonate-siloxane) copolymer to a composition containing glass fiber and a polycarbonate homopolymer results in a significant reduction of DS-4 values, below the threshold values of 300 for HL2 or even 150 for HL3, which makes these compositions suitable for EN45545 types of applications, for example R6 or R1 applications.

With this discovery, it is now possible to manufacture interior train components having the required low smoke densities (Ds-4) measured according to ISO5659-2 on 3 mm thick samples at 50 kW/m$^2$ and low heat release (MAHRE) measured according to ISO 5660-1 on 3 mm thick samples at 50 kW/m$^2$ and optionally low flame spread measured according to ISO 5658-2.

In a further advantageous feature, the interior train components can have high tensile modulus and high tensile strength, which make them suitable for applications requiring strength and stiffness.

The polycarbonate compositions can also be formulated to have low melt viscosities, which renders them suitable for injection molding. In particular, a molded or extruded interior train component can comprise a polycarbonate composition comprising: a first polymer selected from a linear polycarbonate homopolymer, a branched polycarbonate, a poly(carbonate-bisphenol arylate ester), a poly(aliphatic ester-carbonate), or a combination comprising at least one of the foregoing; a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the composition in an amount of 0.3 to 3 wt. %, based on the total weight of the composition; and 10 to 50 wt. % of glass fiber, based on the total weight of the composition; wherein a sample of the polycarbonate composition has: a smoke density after 4 minutes (DS-4) of less than or equal to 300 determined according to ISO 5659-2 on a 3 mm thick plaque at 50 kW/m$^2$ and a maximum average heat release (MAHRE) of equal to or less than 90 kW/m$^2$ measured according to ISO 5660-1 on a 3 mm thick plaque at 50 kW/m$^2$.

In a particularly advantageous feature, the polycarbonate compositions can have low smoke density with Ds-4 values at or below 300 measured according to ISO 5659-2 on a 3 mm thick plaque at 50 kW/m$^2$, a low maximum average heat release (MAHRE) at or below 90 kJ/m$^2$ measured according to ISO 5660-1 on a 3 mm thick plaque at 50 kW/m$^2$, while allowing sufficient melt flow for injection molding of relatively large parts, while simultaneously having high stiffness, high strength and retaining sufficient practical impact resistance characteristics. Optionally, the compositions can have a critical heat flux at extinguishment (CFE) at or above 20 kW/m$^2$ measured according to ISO 5658-2 on a 3 mm thick plaque. In a particularly advantageous feature, the polycarbonate compositions can have low smoke density with Ds-4 values at or below 150 measured according to ISO 5659-2 on a 3 mm thick plaque at 50 kW/m$^2$, a low maximum average heat release (MAHRE) at or below 60 kJ/m$^2$ measured according to ISO 5660-1 on a 3 mm thick plaque at 50 kW/m$^2$, while allowing sufficient melt flow for injection molding of relatively large parts, while simultaneously having high stiffness, high strength and retaining sufficient practical impact resistance characteristics.

As used herein, the term "polycarbonate" and "polycarbonate polymer" refers to compounds comprising bisphenol carbonate units of formula (1)

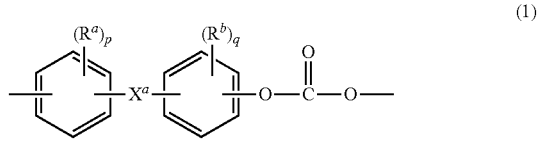

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C(R$^c$)(R$^d$)— wherein R$^c$ and R$^d$ are each independently hydrogen or C$_{1-10}$ alkyl, or a group of the formula —C(=R$^e$)— wherein R$^e$ is a divalent C$_{1-10}$ hydrocarbon group. Exemplary X$^a$ groups include methylene, ethylidene, neopentylidene, and isopropylidene. The bridging group X$^a$ and the carbonate oxygen atoms of each C$_6$ arylene group can be disposed ortho, meta, or para (preferably para) to each other on the C$_6$ arylene group.

In a preferred embodiment, R$^a$ and R$^b$ are each independently a C$_{1-3}$ alkyl group, p and q are each independently 0 to 1, and X$^a$ is a single bond, —O—, —S(O)—, —S(O)$_2$—, —C(O)—, a C$_{1-9}$ alkylidene of formula —C(R$^c$)(R$^d$)— wherein R$^c$ and R$^d$ are each independently hydrogen or C$_{1-8}$ alkyl, or a group of the formula —C(=R$^e$)— wherein R$^e$ is a divalent C$_{1-9}$ hydrocarbon group. In another preferred embodiment, R$^a$ and R$^b$ are each independently a methyl group, p and q are each independently 0 to 1, and X$^a$ is a single bond, a C$_{1-7}$ alkylidene of formula —C(R$^c$)(R$^d$)— wherein R$^c$ and R$^d$ are each independently hydrogen or C$_{1-6}$ alkyl. In an embodiment, p and q is each 1, and R$^a$ and R$^b$ are each a C$_{1-3}$ alkyl group, preferably methyl, disposed meta to the oxygen on each ring. The bisphenol carbonate units (1) can be derived from bisphenol A, where p and q are both 0 and X$^a$ is isopropylidene.

The polycarbonate units in the homopolymers or copolymers can be produced from dihydroxy compounds of the formula (2)

HO—R$^1$—OH (2)

wherein R$^1$ is a bridging moiety. Thus, the bisphenol carbonate units (1) are generally produced from the corresponding bisphenol compounds of formula (3)

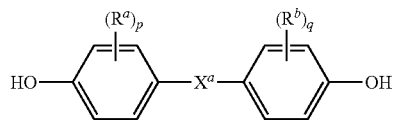

(3)

wherein R$^a$ and R$^b$, p and q, and X$^a$ are the same as in formula (1).

Some illustrative examples of preferred bisphenol compounds that can be used to produce units (1) include 4,4'-dihydroxybiphenyl, bis(4-hydroxyphenyl)methane, 1,2-bis(4-hydroxyphenyl)ethane, 2-(4-hydroxyphenyl)-2-(3-hydroxyphenyl)propane, 1,2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, bis(4-hydroxyphenyl)ether, bis(4-hydroxyphenyl)sulfide, bis(4-hydroxyphenyl)sulfoxide, bis(4-hydroxyphenyl)sulfone, or a combination comprising at least one of the foregoing bisphenolic compounds.

Preferred examples of bisphenol compounds that can be used in the production of bisphenol carbonate units (1) include 1,1-bis(4-hydroxyphenyl)methane, 1,1-bis(4-hydroxyphenyl)ethane, 2,2-bis(4-hydroxyphenyl)propane ("bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl)propane, 1,1-bis(4-hydroxy-t-butylphenyl)propane, and combinations comprising at least one of the foregoing bisphenol compounds.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The water immiscible solvent can be, for example, methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among tertiary amines that can be used are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula (R$^3$)$_4$Q$^+$X$^-$, wherein each R$_3$ is the same or different, and is a C$_{1-10}$ alkyl group; Q is a nitrogen or phosphorus atom; and X is a halogen atom or a C$_{1-8}$ alkoxy group or C$_{6-18}$ aryloxy group. Exemplary phase transfer catalysts include (CH$_3$(CH$_2$)$_3$)$_4$N$^+$X$^-$, (CH$_3$(CH$_2$)$_3$)$_4$P$^+$X$^-$, (CH$_3$(CH$_2$)$_5$)$_4$N$^+$X$^-$, (CH$_3$(CH$_2$)$_6$)$_4$N$^+$X$^-$, (CH$_3$(CH$_2$)$_4$)$_4$N$^+$X$^-$, CH$_3$(CH$_3$(CH$_2$)$_3$)$_3$N$^+$X$^-$, and CH$_3$(CH$_3$(CH$_2$)$_2$)$_3$N$^+$X$^-$, wherein X is Cl$^-$, Br$^-$, a C$_{1-8}$ alkoxy group or a C$_{6-18}$ aryloxy group. An effective amount of a phase transfer catalyst can be 0.1 to 10 wt. %, or 0.5 to 2 wt. %, each based on the weight of bisphenol in the phosgenation mixture.

Alternatively, melt processes can be used to make the polycarbonates. Melt polymerization may be conducted as a batch process or as a continuous process. In either case, the melt polymerization conditions used may comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of about 1,000 to about 7,500 Daltons. In one or more subsequent polymerization stages the number average molecular weight (Mn) of the polycarbonate is increased to between about 8,000 and about 25,000 Daltons (using polycarbonate standard).

The term "melt polymerization conditions" is understood to mean those conditions necessary to effect reaction between a dihydroxy aromatic compound and a diaryl carbonate in the presence of a transesterification catalyst. Typically, solvents are not used in the process, and the reactants dihydroxy aromatic compound and the diaryl carbonate are in a molten state. The reaction temperature can be about 100° C. to about 350° C., preferably about 180° C. to about 310° C. The pressure may be at atmospheric pressure, supra-atmospheric pressure, or a range of pressures from atmospheric pressure to about 15 torr in the initial stages of the reaction, and at a reduced pressure at later stages, for example about 0.2 to about 15 torr. The reaction time is generally about 0.1 hours to about 10 hours.

The diaryl carbonate ester can be diphenyl carbonate, or an activated diphenyl carbonate having electron-withdrawing substituents on the aryl groups, such as bis(4-nitrophenyl) carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

Catalysts used in the melt polymerization of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of a non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of alpha and beta catalyst used can be based upon the total number of moles of dihydroxy compound used in the polymerization reaction. When referring to the ratio of beta catalyst, for example a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1 \times 10^{-2}$ to $1 \times 10^{-8}$ moles, preferably, $1 \times 10^{-4}$ to $1 \times 10^{-7}$ moles of metal per mole of the dihydroxy compounds used. The amount of beta catalyst (e.g., organic ammonium or phosphonium salts) can be $1 \times 10^{-2}$ to $1 \times 10^{-5}$, preferably $1 \times 10^{-3}$ to $1 \times 10^{-4}$ moles per total mole of the dihydroxy compounds in the reaction mixture.

Branched polycarbonate or branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Preferred examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of about 0.05 to about 5 wt. %. Combinations comprising linear polycarbonates and branched polycarbonates can be used.

All types of polycarbonate end groups are contemplated as being useful in the polycarbonate composition, provided that such end groups do not significantly adversely affect desired properties of the compositions. A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be preferably mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are monochloroformates including monocyclic, mono-chloroformates, such as phenyl chloroformate, alkyl-substituted phenyl chloroformate, p-cumyl phenyl chloroformate, toluene chloroformate, and combinations thereof.

In an embodiment, the first polycarbonate is a bisphenol A polycarbonate homopolymer. In another embodiment, the first polycarbonate is a branched polycarbonate comprising units as described above; greater than or equal to 0.2 mole %, based on the total moles of the polycarbonate, of moieties derived from a branching agent; and end-capping groups derived from an end-capping agent having a pKa between about 8.3 and about 11. The branching agent can comprise trimellitic trichloride, 1,1,1-tris(4-hydroxyphenyl)ethane or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, halogens, ester groups, ether groups, or a combination comprising at least one of the foregoing. In a preferred embodiment, the end-capping agent is phenol, p-t-butylphenol, p-methoxyphenol, p-cyanophenol, p-cumylphenol, or a combination comprising at least one of the foregoing.

In another embodiment the first polycarbonate polymer is a polycarbonate copolymer, in particular a poly(carbonate-arylate ester) containing the first repeating bisphenol carbonate units (1) and repeating arylate ester units of formula (7)

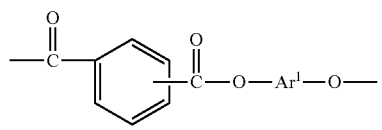

(7)

wherein $Ar^1$ is a $C_{6-32}$ hydrocarbyl group containing at least one aromatic group, e.g., a phenyl, naphthalene, anthracene, or the like. In an embodiment, $Ar^1$ is derived from an aromatic bisphenol as described above in connection with units (1) and (4), a monoaryl dihydroxy compound (6), or a combination comprising different bisphenol or monoaryl dihydroxy compounds. Thus, arylate ester units (7) can be derived by reaction of isophthalic acid, terephthalic acid, or a combination comprising at least one of the foregoing (referred to herein as a "phthalic acid"), with any of the aromatic bisphenols described above, a monoaryl dihydroxy compound (6), or a combination comprising at least one of the foregoing. The molar ratio of isophthalate to terephthalate can be 1:99 to 99:1, or 80:20 to 20:80, or 60:40 to 40:60.

The poly(carbonate-arylate ester) comprising first bisphenol carbonate units (1) and arylate ester units (7) can be alternating or block copolymers of formula (8)

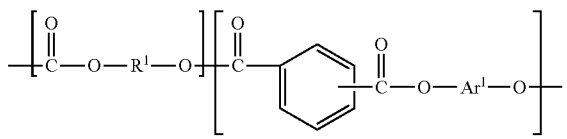

(8)

wherein $R^1$ and $Ar^1$ are as defined in formulae (1) and (7), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, preferably from 90:10 to 10:90, or more preferably from 90:10 to 50:50, depending on the desired properties of the polycarbonate composition. The molar ratio of isophthalate to terephthalate in the ester units of the copolymers can also vary broadly, for example from 0:100 to 100:0, or from 92:8 to 8:92, more preferably from 98:2 to 45:55, depending on the desired properties of the polycarbonate composition. For example, the weight ratio of total ester units to total carbonate can be 99:1 to 40:60, or 90:10 to 50:40, wherein the molar ratio of isophthalate to terephthalate is from 99:1 to 40:50, more preferably 98:2 to 45:55, depending on the desired properties of the polycarbonate composition.

Additional carbonate units derived from the dihydroxy compound used to form the arylate ester units (7) can also be present as described above, for example in amounts of less than 20 mole %, less than 10 mole %, or less than 5 mole %, based on the total moles of units in the polycarbonate copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and such additional arylate ester units are present in an amount of less than 20 mole %, less than 10 mole %, less than 5 mole %, or less than 1 mole % based on the total moles of units in the copolymer.

A preferred poly(carbonate-arylate ester) is a poly(carbonate)-co-(bisphenol arylate ester) comprising carbonate units (1), preferably bisphenol carbonate units, even more preferably bisphenol A carbonate units and repeating bisphenol arylate ester units. Bisphenol arylate units comprise residues of phthalic acid and a bisphenol, for example a bisphenol (3). In an embodiment the bisphenol arylate ester units are of formula (7a)

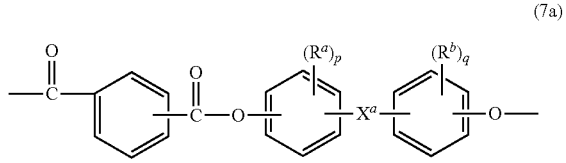

(7a)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. In an embodiment, p and q is each 0 or 1, and $R^a$ and $R^b$ are each a $C_{1-3}$ alkyl group, preferably methyl, disposed meta to the oxygen on each ring, and $X^a$ is an alkylidene of the formula —C($R^c$)($R^d$)— wherein $R^c$ and $R^d$ are each $C_{1-6}$ alkyl. The bisphenol can be bisphenol A, where p and q are both 0 and $X^a$ is isopropylidene.

In a preferred embodiment, the polycarbonate copolymer is a poly(bisphenol A carbonate)-co-(bisphenol A-phthalate-ester) of formula (8a)

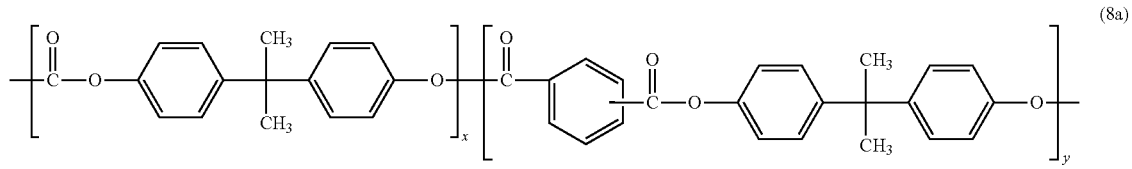

(8a)

wherein y and x represent the weight percent of arylate-bisphenol A ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (8a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE), and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a preferred polycarbonate copolymer is a poly(carbonate)-co-(monoaryl arylate ester) containing carbonate units (1) and repeating monoaryl arylate ester units of formula (7b)

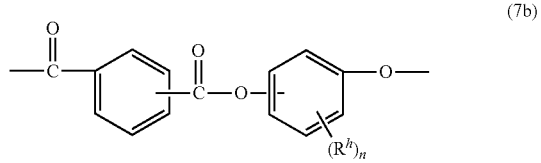

(7b)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Preferably, each $R^h$ is independently a $C_{1-4}$ alkyl, and n is 0 to 3, 0 to 1, or 0. These poly(carbonate)-co-(monoaryl arylate ester) copolymers are of formula (8b)

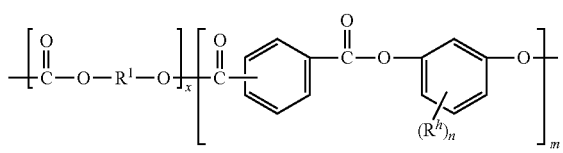

(8b)

wherein $R^1$ is as defined in formula (1) and $R^h$, and n are as defined in formula (7b), and the mole ratio of x:m is 99:1 to 1:99, preferably 80:20 to 20:80, or 60:40 to 40:60.

Preferably, the monoaryl-arylate ester unit (7b) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (7c)

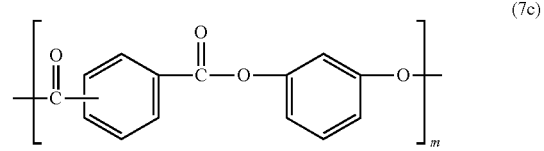

(7c)

wherein m is 4 to 100, 4 to 90, 5 to 70, more preferably 5 to 50, or still more preferably 10 to 30. In an embodiment, the ITR ester units are present in the polycarbonate copolymer in an amount greater than or equal to 95 mol %, preferably greater than or equal to 99 mol %, and still more preferably greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition preferredity in the synthesis of the ITR-PC copolymers.

A preferred example of a poly(carbonate)-co-(monoaryl arylate ester) is a poly(bisphenol A carbonate)-co-(isophthalate-terephthalate-resorcinol ester) of formula (8c)

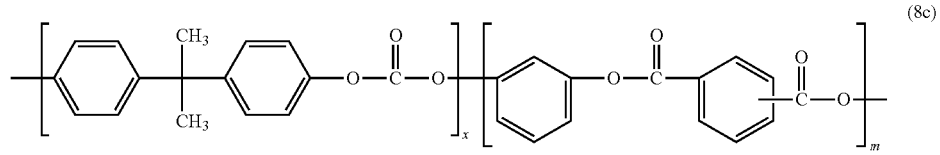

(8c)

wherein m is 4 to 100, 4 to 90, 5 to 70, more preferably 5 to 50, or still more preferably 10 to 30, and the mole ratio of x:n is 99:1 to 1:99, preferably 90:10 to 10:90. The ITR ester units are present in the poly(carbonate-arylate ester) copolymer in an amount greater than or equal to 95 mol %, preferably greater than or equal to 99 mol %, and still more preferably greater than or equal to 99.5 mol % based on the total moles of ester units. Other carbonate units, other ester units, or a combination comprising at least one of the foregoing can be present, in a total amount of 1 to 20 mole % based on the total moles of units in the copolymers, for example resorcinol carbonate units of formula (20) and bisphenol ester units of formula (7a):

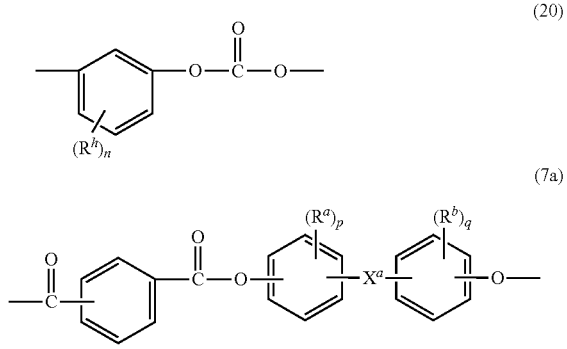

wherein, in the foregoing formulae, $R^h$ is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group. The bisphenol ester units can be bisphenol A phthalate ester units of the formula

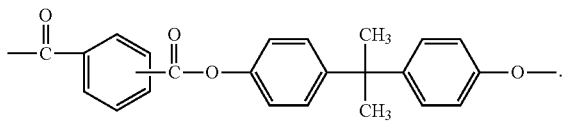

In an embodiment, poly(bisphenol A carbonate)-co-(isophthalate-terephthalate-resorcinol ester) (8c) comprises 1 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination comprising at least one of the foregoing.

The polycarbonate copolymers comprising arylate ester units are generally prepared from polyester blocks. The polyester blocks can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The polycarbonate copolymers comprising arylate ester units can have an $M_w$ of 2,000 to 100,000 g/mol, preferably 3,000 to 75,000 g/mol, more preferably 4,000 to 50,000 g/mol, more preferably 5,000 to 35,000 g/mol, and still more preferably 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of about 1.0 ml/min with methylene chloride as the eluent.

The poly(aliphatic ester-carbonate) is derived from a linear $C_{6-20}$ aliphatic dicarboxylic acid, preferably a linear $C_6$-$C_{12}$ aliphatic dicarboxylic acid. Preferred dicarboxylic acids include n-hexanedioic acid (adipic acid), n-decanedioic acid (sebacic acid), and alpha, omega-$C_{12}$ dicarboxylic acids such as dodecanedioic acid (DDDA). As is known in the art, a derivative of the acids can be used during manufacture, for example the corresponding acid halide or acid anhydride, and the terms "derived from a dicarboxylic acid" includes esters derived from such derivatives. A preferred poly(aliphatic ester)-polycarbonate is of formula:

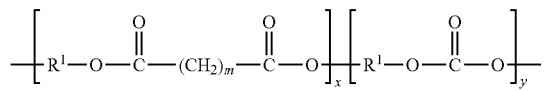

wherein each $R^1$ can be the same or different, and is as described in formula (1), m is 4 to 18, preferably 4 to 10, and the average molar ratio of ester units to carbonate units x:y is 99:1 to 1:99, including 13:87 to 2:98, or 9:91 to 2:98, or 8:92 to 2:98. In a preferred embodiment, the poly(aliphatic ester)-polycarbonate copolymer comprises bisphenol A sebacate ester units and bisphenol A carbonate units, having, for example an average molar ratio of x:y of 2:98 to 8:92, for example 6:94. Such poly(aliphatic ester-carbonate)s are commercially available as LEXAN HFD from the Innovative Plastics Division of SABIC (LEXAN is a trademark of SABIC IP B. V.).

The poly(aliphatic ester-carbonate) can have a weight average molecular weight of 15,000 to 40,000 Dalton (Da), including 20,000 to 38,000 Da, as measured by GPC based on BPA polycarbonate standards.

The second polymer is different from the first polycarbonate and comprises a poly(carbonate-siloxane) copolymer, a polydialkylsiloxane, a silicone graft copolymer, or a combination comprising at least one of the foregoing, wherein siloxane units in the second polymer are present in the composition in an amount of 0.3 to 3 wt. %, based on the total weight of the composition.

The polydialkylsiloxanes are silicone oils of low volatility, for example silicone oils with a viscosity of from 10 millipascal-second (mPa-s, also known as centipoise, cps) to 100,000,000 mPa-s at 25° C. are preferable, and silicone oils with a viscosity of from 20 mPa-s to 10,000,000 mPa-s at 25° C. Examples of such silicone oils include oils having linear, partially branched linear, cyclic, or branched molecular structures, with oils having linear or cyclic structures being preferably mentioned. The silicone oils have no, or substantially no reactive groups, for example no alkenyl groups, no silicon-bonded hydrogen atoms, no silanol groups, and no silicon-bonded hydrolyzable groups. The alkyl groups can be the same or different and can have 1 to 10 carbon atoms, 1 to 6 carbon atoms, or 1 to 3 carbon atoms. In an embodiment, the silicone oil is a polydimethylsiloxane, for example a polydimethylsiloxane having a viscosity from 50 to 1,000 mPa-s at 25° C.

The poly(carbonate-siloxane) copolymers, also referred to as "PC-siloxane," can contain bisphenol carbonate units (1) and repeating siloxane units (also known as "diorganosiloxane units"). The siloxane units can be polysiloxane units of formula (9)

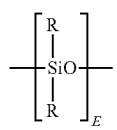
(9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R groups can be used in the same copolymer. In an embodiment, the polysiloxane comprises R groups that have minimal hydrocarbon content. In a preferred embodiment, an R group with a minimal hydrocarbon content is a methyl group.

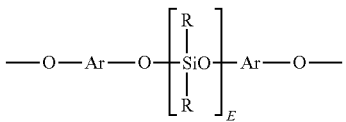
(9a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound (6) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl) butane, 2,2-bis(4-hydroxyphenyl) octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a preferred embodiment, where Ar is derived from resorcinol, the polysiloxane units are of the formula (9a-1)

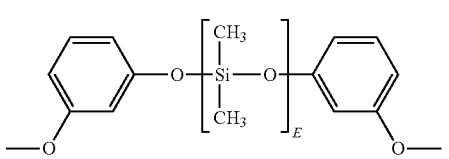
(9a-1)

or, where Ar is derived from bisphenol A, the polysiloxane has the formula (9a-2)

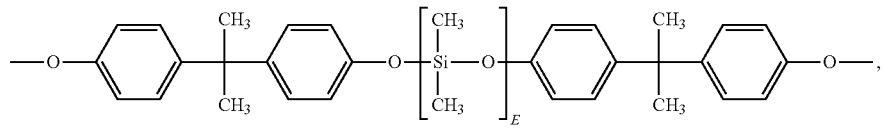
(9a-2)

The average value of E in formula (9) can vary widely depending on the type and relative amount of each component in the polycarbonate composition, whether the polymer is linear, branched or a graft copolymer, the desired properties of the composition, and like considerations. In an embodiment, E has an average value of 2 to 500, 2 to 200, or 5 to 120, 10 to 100, 10 to 80, 2 to 30, or 30 to 80. In an embodiment E has an average value of 16 to 50, more preferably 20 to 45, and even more preferably 25 to 45. In another embodiment, E has an average value of 4 to 50, 4 to 15, preferably 5 to 15, more preferably 6 to 15, and still more preferably 7 to 10. In an embodiment, the polysiloxane units are structural units of formula (9a)

or a combination comprising at least one of the foregoing can be used, wherein E has an average value as described above, preferably an average value of 2 to 200, 2 to 90, 2 to 50, 2 to 30, 5 to 15, or 7 to 10.

In another embodiment, polydiorganosiloxane units are units of formula (9b)

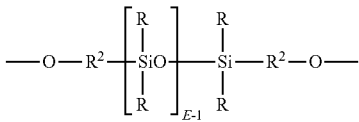
(9b)

wherein R and E are as described for formula (9), and each $R^2$ is independently a divalent $C_{1-30}$ alkylene or $C_{7-30}$ arylene-alkylene. In a preferred embodiment, where $R^2$ is $C_{7-30}$ arylene-alkylene, the polydiorganosiloxane units are of formula (9b-1)

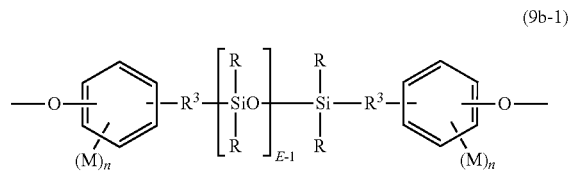

(9b-1)

wherein R and E are as defined for formula (9), and each $R^3$ is independently a divalent $C_{2-8}$ aliphatic group. Each M in formula (25) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl. The foregoing poly(carbonate-siloxane) copolymers can be manufactured by the methods described in U.S. Pat. No. 6,072,011 to Hoover, for example.

In a preferred embodiment, the polysiloxane units are eugenol-capped polysiloxane units of formula (9b-2)

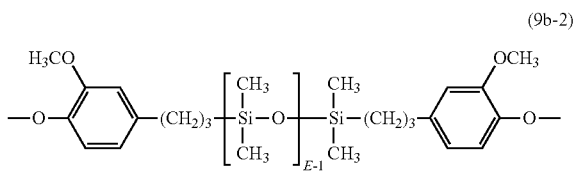

(9b-2)

where E has an average value as described above, preferably 2 to 200, 2 to 100, 2 to 90, 2 to 80, or 2 to 30, 20 to 20, or 30 to 80. In another preferred embodiment, the polysiloxane units are of formula (9b-3) or (9b-4)

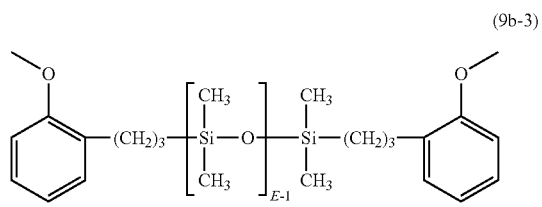

(9b-3)

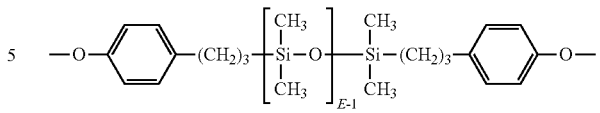

(9b-4)

where E has an average value as defined above, preferably an average value of 2 to 200, 2 to 90, 2 to 50, 2 to 30, 5 to 15, or 7 to 10.

The relative amount of carbonate units (1) and polysiloxane units (9) in the PC-siloxane copolymers depends on the desired properties of the polycarbonate composition, such as impact, smoke density, heat release, and melt viscosity. In particular the polycarbonate copolymer is selected to have an average value of E that provides good impact and/or transparency properties, as well as to provide the desired weight percent of siloxane units in the polycarbonate composition. For example, the polycarbonate copolymers can comprise siloxane units in an amount of 0.3 to 3 weight percent (wt. %), preferably 0.3 to 3 wt. %, or 0.6 to 1.5 wt. % of siloxane, based on the total weight of the polycarbonate composition, with the proviso that the siloxane units are provided by polysiloxane units covalently bonded in the polymer backbone of the polycarbonate copolymer.

A preferred PC-siloxane comprises carbonate units (1) derived from bisphenol A, and second repeating siloxane units (9b-2), (9b-3), (9b-4), or a combination comprising at least one of the foregoing, preferably (9b-2). This polycarbonate copolymer can comprise the siloxane units in an amount of 0.1 to 60 weight percent (wt. %), 0.5 to 55 wt. %, 0.5 to 45 wt. % 0.5 to 30 wt. %, or 0.5 to 20 wt. %, based on the total weight of the polycarbonate copolymer, with the proviso that the siloxane units are covalently bound to the polymer backbone of the polycarbonate copolymer. In an embodiment, the remaining units are bisphenol units (1). Transparency can be achieved in this embodiment when E has an average value of 4 to 50, 4 to 15, preferably 5 to 15, more preferably 6 to 15, and still more preferably 7 to 10. The transparent PC-siloxanes can be manufactured using one or both of the tube reactor processes described in U.S. Patent Application No. 2004/0039145A1 or the process described in U.S. Pat. No. 6,723,864 may be used to synthesize the poly (siloxane-carbonate) copolymers.

These and other methods for the manufacture of the PC-siloxane copolymers are known. The PC-siloxane copolymers can have an intrinsic viscosity, as determined in chloroform at 25° C., of 0.3 to 1.5 deciliters per gram (dl/g), preferably 0.45 to 1.0 dug. The PC-siloxane copolymers can have a weight average molecular weight ($M_w$) of 10,000 to 100,000 g/mol, as measured by gel permeation chromatography (GPC) using a cross linked styrene-divinyl benzene column, at a sample concentration of 1 milligram per milliliter, and as calibrated with polycarbonate standards.

The silicone graft copolymer can be a silicon core-shell graft copolymer prepared by grafting ethylenically unsaturated monomers onto a rubbery silicone core, thus forming a rigid shell. Methods for preparing the silicone core-shell graft copolymers are known in the art. For example, silicone core-shell graft copolymers can be prepared by methods disclosed in U.S. Pat. No. 7,615,594, or in Abele et al., "Silicone Based Flame Retardant for Polycarbonate," ANTEC, 2009, pp. 1351-1354.

The ethylenically unsaturated monomers used to form the shell are generally a combination of a monofunctional monomer and a copolymerizable polyfunctional monomer. Examples of monofunctional monomers include styrene, α-methylstyrene, halogen or $C_{1-3}$alkyl substituted styrene, acrylonitrile, methacrylonitrile, maleic acid, maleic anhydride, $C_1$-$C_4$alkyl and phenyl N-substituted maleimide, $C_1$-$C_8$alkyl methacrylates, $C_1$-$C_8$alkyl acrylates, and the like. Example of copolymerizable polyfunctional monomers include allyl methacrylate, triallyl cyanurate, triallyl isocyanurate, diallyl phthalate, ethylene glycol dimethacrylate, 1,3-butylene glycol dimethacrylate, divinyl benzene, and the like. Preferred monomers are the $C_1$-$C_8$alkyl methacrylates, $C_1$-$C_8$alkyl acrylates, for example, $C_1$-$C_6$ alkyl methacrylates.

The rubbery silicone core can be prepared by polymerization of a cyclosiloxane in the presence of a curing agent to produce particles. The particles can have an average diameter of 0.1 to 1 micrometer. Examples of cyclosiloxanes include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrosiloxane, octaphenylcyclotetrasiloxane, and the like. Examples of curing agents include reactive silanes, for example trimethoxymethylsilane, tetramethoxysilane, tetraethoxysilane, and the like. The silicone core can comprise 20 to 100 wt % of silicone, or 30 to 95 wt % of silicone, with the remainder of the core being rubber groups.

The rubber content of the silicone-based core-shell graft copolymer can be in the range of 30 to 90% by weight. In some embodiments, the silicone core-shell graft copolymer comprises more than 70 wt %, or 60 to 80 wt %, or 60 to 70 wt %, or 65 to 75 wt % of the silicone core component, wherein the graft shell component is derived from primarily $C_1$-$C_6$alkyl methacrylates. A commercially available silicone core-shell graft copolymer is sold under the tradename KANE ACE™ MR-01 by Kaneka Corporation (Japan).

In addition to the first polycarbonate and the second polymer, the polycarbonate composition further comprises glass fibers. Suitable glass fibers include those having nominal filament diameters of about 4.0 to about 35.0 micrometers or 5.0 to 30.0 micrometers. The filaments are made by standard processes, e.g., by steam or air blowing, flame blowing, and mechanical pulling. Exemplary filaments are made by mechanical pulling. Use of non-round fiber cross sections is also possible. The glass fibers may be sized or unsized. Sized glass fibers are coated on their surfaces with a sizing composition selected for compatibility with the polycarbonate. The sizing composition facilitates wet-out and wet-through of the polycarbonate upon the fiber strands and assists in attaining desired physical properties in the polycarbonate composition.

The glass fibers are preferably glass strands that have been sized. In preparing the glass fibers, a number of filaments can be formed simultaneously, sized with the coating agent, and then bundled into what is called a strand. Alternatively the strand itself may be first formed of filaments and then sized. The amount of sizing employed is generally that amount which is sufficient to bind the glass filaments into a continuous strand and ranges from about 0.1 to about 5 wt. %, about 0.1 to 2 wt. % based on the weight of the glass fibers. Generally, this may be about 1.0 wt. % based on the weight of the glass filament. Glass fibers in the form of chopped strands may have a length of about 0.3 millimeter to about 10 centimeters, preferably about 0.5 millimeter to about 5 centimeters, and more preferably about 1.0 millimeter to about 2.5 centimeters.

In an embodiment, bonding glass fibers can outperform non-bonding glass fibers especially with respect to tensile strength, while modulus is also higher, without a significant drop in impact. Bonding glass fibers have a sizing onto the surface of the glass fibers to allow good coupling of the fibers to the thermoplastic matrix, and as such improve properties such as strength and stiffness. For instance, this can be achieved with a silane coating, which chemically bonds with the resin. As such, bonding glass types can be used to achieve the right combination of low smoke density and good mechanical properties.

In general, the glass fibers are present in the polycarbonate composition in an amount of about 10 to about 50 wt. %, preferably about 10 to about 40 wt. %, and more preferably about 15 to about 30 wt. %, based on the total weight of the polycarbonate composition.

The addition of relatively small amount of PC-siloxane, polydialkylsiloxane or silicone graft copolymer, or a combination thereof, to the above described glass-filled polycarbonate polymers reduces the smoke density DS-4 values significantly. Similar improvements in DS-4 values can be achieved at the same siloxane content irrespective of the architecture of the siloxane containing polymer. Further, the length of the siloxane block does not have a significant influence on the smoke density when compared at the same siloxane content in the polycarbonate composition. In an embodiment, the siloxane containing polymer is present in an amount effective to provide 0.3 to 3.00 wt. % of siloxane units based on the total weight of the polycarbonate composition.

In an embodiment, the low smoke polycarbonate compositions do not contain or substantially free of any brominated polycarbonate. As used herein, "substantially free of" refers to a composition containing less than 5 wt. %, preferably less than 1 wt. %, more preferably less than 0.1 wt. % of a brominated polycarbonate.

The polycarbonate compositions can include various other polymers to adjust the properties of the polycarbonate compositions, with the proviso that the other polymers are selected so as to not adversely affect the desired properties of the polycarbonate composition significantly, in particular low smoke density and low heat release. Other polymers include an impact modifier such as natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like can be present. In general such other polymers provide less than 50 wt. %, less than 40 wt. %, less than 30 wt. %, less than 20 wt. %, or less than 10 wt. % of the total composition. In an embodiment, no other polymers are present. In a preferred embodiment, no polymers containing halogen are present in the polycarbonate compositions.

The polycarbonate compositions can include various additives ordinarily incorporated into flame retardant compositions having low smoke density and low heat release, with the proviso that the additive(s) are selected so as to not adversely affect the desired properties of the polycarbonate composition significantly, in particular low smoke density and low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, light diffuser additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25 parts per hundred parts by the total weight of the polymers in the composition (phr).

Examples of inorganic pigments are white pigments such as titanium dioxide in its three modifications of rutile, anatase or brookite, lead white, zinc white, zinc sulfide or lithopones; black pigments such as carbon black, black iron oxide, iron manganese black or spinel black; chromatic pigments such as chromium oxide, chromium oxide hydrate green, cobalt green or ultramarine green, cobalt blue, iron blue, Milori blue, ultramarine blue or manganese blue, ultramarine violet or cobalt and manganese violet, red iron oxide, cadmium sulfoselenide, molybdate red or ultramarine red; brown iron oxide, mixed brown, spinel phases and corundum phases or chromium orange; yellow iron oxide, nickel titanium yellow, chromium titanium yellow, cadmium sulfide, cadmium zinc sulfide, chromium yellow, zinc yellow, alkaline earth metal chromates, Naples yellow; bismuth vanadate, and effect pigments such as interference pigments and luster pigments. Other preferred inorganic pigments include Pigment White 6, Pigment White 7, Pigment Black 7, Pigment Black 11, Pigment Black 22, Pigment Black 27/30, Pigment Yellow 34, Pigment Yellow 35/37, Pigment Yellow 42, Pigment Yellow 53, Pigment Brown 24, Pigment Yellow 119, Pigment Yellow 184, Pigment Orange 20, Pigment Orange 75, Pigment Brown 6, Pigment Brown 29, Pigment Brown 31, Pigment Yellow 164, Pigment Red 101, Pigment Red 104, Pigment Red 108, Pigment Red 265, Pigment Violet 15, Pigment Blue 28/36, Pigment Blue 29, Pigment Green 17, and Pigment Green 26/50. A combination comprising at least one of the foregoing pigments can be used.

Exemplary dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes can be used in amounts of 0.001 to 5 PHR.

The use of pigments such as titanium dioxide produces white compositions, which are commercially desirable. It has surprisingly been found that the use of titanium dioxide can further improve smoke density and/or heat release properties. Pigments such as titanium dioxide (or other mineral fillers) can be present in the polycarbonate compositions in amounts of 0 to 12 wt. %, 0.1 to 12 wt. %, 0.1 to 9 wt. %, 0.5 to 5 wt. %, or 0.5 to 3 wt. %, each based on the total weight of the composition.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 PHR.

Exemplary heat stabilizer additives include organophosphites such as triphenyl phosphite, tris-(2,6-dimethylphenyl) phosphite, and tris-(mixed mono- and di-nonylphenyl)phosphite; phosphonates such as dimethylbenzene phosphonate, phosphates such as trimethyl phosphate; or combinations comprising at least one of the foregoing heat stabilizers. Heat stabilizers are used in amounts of 0.01 to 0.1 PHR.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers; or combinations comprising at least one of the foregoing UV absorbers. UV absorbers are used in amounts of 0.01 to 5 PHR.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly (ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Flame retardant salts are not needed to obtain the desired low smoke and low heat release properties, but can be added to improve other flame retardant properties. Examples of flame retardant salts include of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate (KSS); salts such as $Na_2CO_3$, $K_2CO_3$, $MgCO_3$, $CaCO_3$, and $BaCO_3$, phosphate salts, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. In an embodiment, no flame retardant salts are present. When present, flame retardant salts are present in amounts of 0.01 to 10 PHR, more preferably 0.02 to 1 PHR.

Organic flame retardants can be present, for example organic compounds that include phosphorus, nitrogen, bromine, and/or chlorine. However, halogenated flame retardants are generally avoided, such that the polycarbonate composition can be essentially free of chlorine and bromine "Essentially free of chlorine and bromine" as used herein means having a bromine and/or chlorine content of less than or equal to 100 parts per million by weight (ppm), less than or equal to 75 ppm, or less than or equal to 50 ppm, based on the total parts by weight of the composition, excluding any filler.

The polycarbonate compositions can further comprise an organophosphorus flame retardant in an amount effective to provide 0.1 to 2.0 wt. % phosphorus, based on the weight of the composition. For example, the organophosphorus compound, preferably BPADP or RDP can be present in an amount of 2 to 20 wt. %, which is effective to provide 0.1 to 2.0 wt. % of phosphorus based on the total weight of the composition. Inventors have found that certain organophosphorus flame retardants for example BPADP can be added to the composition without compromising smoke density or heat release, for instance to significantly improve the melt flow of the compositions Organophosphorus compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more non-aromatic moieties, for example alkyl, alkenyl, alkynyl, or cycloalkyl. The aromatic moiety of the aromatic group can be directly bonded to the phosphorus-containing group, or bonded via another moiety, for example an alkylene group. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol A), a monoarylene group (e.g., a 1,3-phenylene or a 1,4-phenylene), or a combination comprising at least one of the foregoing.

The phosphorus-containing group can be a phosphate $(P(=O)(OR)_3)$, phosphite $(P(OR)_3)$, phosphonate $(RP(=O)(OR)_2)$, phosphinate $(R_2P(=O)(OR))$, phosphine oxide $(R_3P(=O))$, or phosphine $(R_3P)$, wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl)phosphate, phenyl bis (neopentyl)phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl)phenyl phosphate, tri(nonylphenyl)phosphate, bis(dodecyl) p-tolyl phosphate, dibutyl phenyl phosphate, 2-chloroethyl diphenyl phosphate, p-tolyl bis (2,5,5'-trimethylhexyl)phosphate, 2-ethylhexyl diphenyl phosphate, and the like. A preferred aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of formula (14)

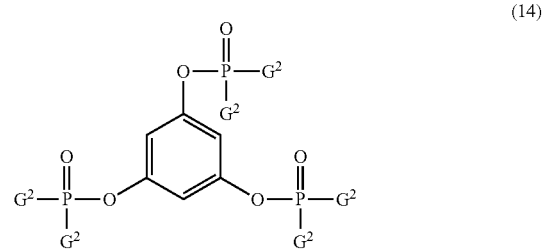

(14)

wherein each $G^2$ is independently a hydrocarbon or hydrocarbonoxy having 1 to 30 carbon atoms. In some embodiments G corresponds to a monomer used to form the polycarbonate, e.g., resorcinol.

Preferred aromatic organophosphorus compounds have two or more phosphorus-containing groups, and are inclusive of acid esters of formula (15)

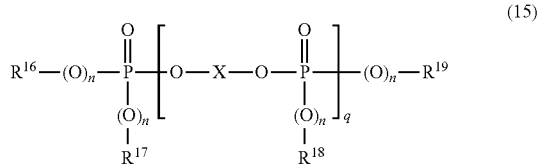

(15)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, preferably by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}$, $R^{18}$, and $R^{19}$ are each independently $C_{1-4}$ alkyl, naphthyl, phenyl($C_{1-4}$)alkylene, or aryl groups optionally substituted by $C_{1-4}$ alkyl. Preferred aryl moieties are cresyl, phenyl, xylenyl, propylphenyl, or butylphenyl. In some embodiments X in formula (15) is a mono- or poly-nuclear aromatic $C_{6-30}$ moiety derived from a diphenol. Further in formula (15), n is each independently 0 or 1; in some embodiments n is equal to 1. Also in formula (15), q is from 0.5 to 30, from 0.8 to 15, from 1 to 5, or from 1 to 2. Preferably, X can be represented by the following divalent groups (16), or a combination comprising one or more of these divalent groups.

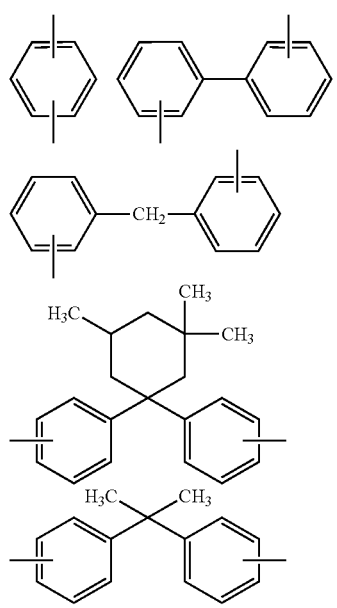

(16)

In these embodiments, each of $R^{16}$, $R^{17}$, $R^{18}$, and $R^{19}$ can be aromatic, i.e., phenyl, n is 1, and p is 1-5, preferably 1-2. In some embodiments at least one of $R^{16}$, $R^{17}$, $R^{18}$, $R^{19}$, and X corresponds to a monomer used to form the polycarbonate, e.g., bisphenol A or resorcinol. In another embodiment, X is derived especially from resorcinol, hydroquinone, bisphenol A, or diphenylphenol, and $R^{16}$, $R_{17}$, $R^{18}$, $R^{19}$, is aromatic, preferably phenyl. A preferred aromatic organophosphorus compound of this type is resorcinol bis(diphenyl phosphate), also known as RDP. Another preferred class of aromatic organophosphorus compounds having two or more phosphorus-containing groups are compounds of formula (17)

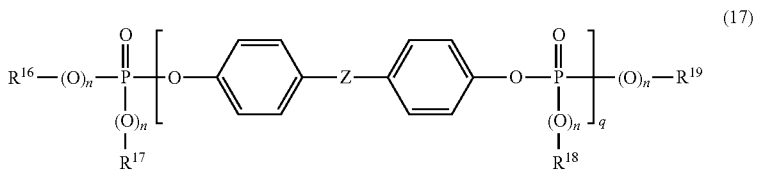

(17)

wherein $R^{16}$, $R^{17}$, $R^{18}$, $R^{19}$, n, and q are as defined for formula (19) and wherein Z is $C_{1-7}$ alkylidene, $C_{1-7}$ alkylene, $C_{5-12}$ cycloalkylidene, —O—, —S—, —SO$_2$—, or —CO—, preferably isopropylidene. A preferred aromatic organophosphorus compound of this type is bisphenol A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl)phosphine oxide. Phosphazenes (18) and cyclic phosphazenes (19)

(18)

(19)

in particular can used, wherein w1 is 3 to 10,000 and w2 is 3 to 25, preferably 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Accordingly, depending on the particular organophosphorus compound used, the polycarbonate compositions can comprise from 0.3 to 20 wt. %, or 0.5 to 15 wt. %, or 3.5 to 12 wt. % of the organophosphorus flame retardant, each based on the total weight of the composition. Preferably, the organophosphorus compounds can be bisphenol A bis(diphenyl phosphate), triphenyl phosphate, resorcinol bis(diphenyl phosphate), tricresyl phosphate, or a combination comprising at least one of the foregoing.

Anti-drip agents in most embodiments are not used in the polycarbonate compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the polycarbonate compositions in some embodiments.

Methods for forming the polycarbonate compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. The polycarbonate compositions can be foamed, extruded into a sheet, or optionally pelletized. Methods of foaming a polycarbonate composition using frothing or physical or chemical blowing agents are known and can be used. The pellets can be used for molding into articles, foaming, or they can be used in forming a sheet of the flame retardant polycarbonate composition. In some embodiments, the composition can be extruded (or co-extruded with a coating or other layer) in the form of a sheet and/or can be processed through calendaring rolls to form the desired sheet.

As discussed above, the polycarbonate compositions are formulated to meet strict low smoke density requirements. The relative amounts of polycarbonate polymer and the second polymer in the polycarbonate compositions depend on the particular polycarbonate polymer and the second polymer used, the targeted level of smoke density and heat release, and other desired properties of the polycarbonate composition, such as stiffness, strength, impact strength, and flow. In an embodiment, the second polymer is present in an amount effective to provide 0.3 to 3 wt. % of siloxane units based on the total weight of the polycarbonate composition, and within this range the preferred amount is selected to be effective to provide a smoke density (Ds-4) of less than 300, or of less than 250, or of less than 200, or of less than 150, or of less than 100, measured according to ISO 5659-2 on a 3 mm thick plaque at 50 kW/m$^2$. These values can be obtained in articles having a wide range of thicknesses, for example from 0.1 to 10 mm, or 0.5 to 5 mm.

The polycarbonate compositions can further have a maximum average rate of heat emission (MAHRE) of 90 kW/m$^2$ or less, or 80 kW/m$^2$ or less, or 70 kW/m$^2$ or less, or 60 kW/m$^2$ or less, or 50 kW/m$^2$ or less, or 40 kW/m$^2$ or less, as measured according to ISO 5660-1 on a 3 mm thick plaque at 50 kW/m$^2$.

Use of a PC-siloxane, a polydialkylsiloxane, a polyorganosiloxane-containing graft copolymer or a combination thereof, together with glass fiber and a polycarbonate, selected from a linear polycarbonate homopolymer, a branched polycarbonate, a poly(carbonate-bisphenol arylate ester), a poly(aliphatic ester-carbonate), or a combination comprising at least one of the foregoing can lower smoke density (Ds-4) of polycarbonate composition to the desired levels. For example, polycarbonate polymers such as linear bisphenol A polycarbonate homopolymer, branched bisphenol A polycarbonate, poly(carbonate-bisphenol arylate ester) or poly(aliphatic ester-carbonate) have limited inherent smoke and heat release properties. However, a combination of these polycarbonate polymers with glass fiber and a siloxane containing polymer such as (bisphenol A carbonate)-co-(polydimethylsiloxane), polydialkylsiloxane, polyorganosiloxane-containing graft copolymer, or a combination thereof has positive effect on the smoke density (Ds-4) measured according to ISO5659-2 on a 3 mm thick plaque at 50 kW/m$^2$, such that these compositions have smoke density (Ds-4) values of less than 300 or even less than 150, as well as heat release values (MAHRE) less than 90 kW/m$^2$ or even less 60 kW/m$^2$, measured according to ISO5660-1 on a 3 mm thick plaque at 50 kW/m$^2$, which makes these compositions suitable for EN-45545 type applications (for example, R6 applications qualifying for HL2 compliance, a smoke density (Ds-4) at or below 300 is required at 50 kW/m$^2$ and a heat release (MAHRE) at or below 90 kW/m$^2$ is required at 50 kW/m$^2$, whereas for HL3 compliance, a smoke density (Ds-4) at or below 150 is required at 50 kW/m$^2$ and a heat release (MAHRE) at or below 60 kW/m$^2$ is required at 50 kW/m$^2$,), provided that the other required properties (e.g. heat release) meet the selection criteria as well.

Thus, in some embodiments the compositions can have a MAHRE of 90 kW/m$^2$ or less as measured according to ISO 5660-1 on a 3 mm thick plaque at 50 kW/m$^2$, a Ds-4 smoke density of 300 or less as measured according to ISO 5659-2 on a 3 mm thick plaque at 50 kW/m$^2$, measured according to resulting in R6 applications in compliance with Hazard Level 2 rating for the EN45545 (2013) standard. These values can be obtained in articles having a wide range of thicknesses, for example from 0.1 to 10 mm, or 0.5 to 5 mm.

Thus, in some embodiments the compositions can have a MAHRE of 60 kW/m$^2$ or less as measured according to ISO 5660-1 on a 3 mm thick plaque at 50 kW/m$^2$, a Ds-4 smoke density of 150 or less as measured according to ISO 5659-2 on a 3 mm thick plaque at 50 kW/m$^2$, measured according to resulting in R6 applications in compliance with Hazard Level 3 rating for the EN45545 (2013) standard. These values can be obtained in articles having a wide range of thicknesses, for example from 0.1 to 10 mm, or 0.5 to 5 mm. The compositions can also optionally have a critical heat flux at extinguishment (CFE) at or above 20 kW/m$^2$, at or above 22 kW/m$^2$, or at or above 24 kW/m$^2$ measured according to ISO 5658-2 on a 3 mm thick plaque.

The polycarbonate compositions can be formulated to have lower densities, in particular a density of 1.66 g/cc or less, 1.60 g/cc or less, 1.55 g/cc or less, 1.50 g/cc or less, 1.45 g/cc or less, 1.40 g/cc or less, 1.35 g/cc or less, 1.30 g/cc or less, or 1.25 g/cc or less, as measured according to ISO 1183. The same or similar values can be obtained in components having a wide range of thicknesses, for example from 0.1 to 10 mm, or 0.5 to 5 mm.

The polycarbonate compositions can further have good melt viscosities, which aid processing. The polycarbonate compositions can have a melt volume flow rate (MVR, cubic centimeter per 10 minutes (cc/10 min) of 3 to about 25, greater than or equal to 5, greater than or equal to 7, greater than or equal to 9, greater than or equal to 11, greater than or equal to 13, greater than or equal to 15, greater than or equal to 17, or greater than or equal to 120 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm.

The polycarbonate compositions can further have excellent impact properties, in particular Izod notched impact (INI). The compositions can have an INI energy greater than or equal to 6 kJ/m$^2$, greater than or equal to 8 kJ/m$^2$, greater than or equal to 10 kJ/m$^2$, greater than or equal to 12 kJ/m$^2$, greater than or equal to 14 kJ/m$^2$, greater than or equal to 16 kJ/m$^2$, measured at 23° C. at an impact energy of 5.5 J according to ISO 180 on an Izod impact bar with a thickness of 4 mm. These values can be obtained in articles having a wide range of thicknesses, for example from 0.1 to 10 mm, or 0.5 to 5 mm. In some embodiments, the composition can have an INI energy equal to or higher than 8 kJ/m$^2$ at lower temperatures such as 10° C., 0° C., −10° C., −20° C. and −30° C.

The polycarbonate compositions can further have excellent strength, in particular tensile or flexural strength. The compositions can have a tensile strength greater than or equal to 50 MPa, greater than or equal to 60 MPa, greater than or equal to 70 MPa, greater than or equal to 80 MPa, greater than or equal to 90 MPa, greater than or equal to 100 MPa, greater than or equal to 110 MPa, greater than or equal to 120 MPa, measured at 23° C. at a speed of 5 mm/min according to ISO 527 on a multi-purpose ISO 527 tensile bar. These values can be obtained in articles having a wide range of thicknesses, for example from 0.1 to 10 mm, or 0.5 to 5 mm. The compositions can further have a flexural strength greater than or equal to 80 MPa, greater than or equal to 90 MPa, greater than or equal to 100 MPa, greater than or equal to 110 MPa, greater than or equal to 120 MPa, greater than or equal to 130 MPa, greater than or equal to 140 MPa, greater than or equal to 150 MPa, greater than or equal to 160 MPa, measured at 23° C. at a speed of 2 mm/min according to ISO 178 on a Izod impact bar with a thickness of 4 mm.

The polycarbonate compositions can further have excellent stiffness, in particular tensile or flexural modulus. The compositions can have a tensile modulus greater than or equal to 3400 MPa, greater than or equal to 4000 MPa, greater than or equal to 6000 MPa, greater than or equal to 8000 MPa, greater than or equal to 10000 MPa, greater than or equal to 12000 MPa, greater than or equal to 14000 MPa, measured at 23° C. at a speed of 1 mm/min according to ISO 527 on a multi-purpose ISO 527 tensile bar. These values can be obtained in articles having a wide range of thicknesses, for example from 0.1 to 10 mm, or 0.5 to 5 mm. The compositions can have a flexural modulus greater than or equal to 3200 MPa, greater than or equal to 4000 MPa, greater than or equal to 6000 MPa, greater than or equal to 8000 MPa, greater than or equal to 10000 MPa, greater than or equal to 12000 MPa, measured at 23° C. at a speed of 2 mm/min according to ISO 178 on a Izod impact bar with a thickness of 4 mm.

As noted above the present discovery allows the manufacture of compositions have very low smoke densities (Ds-4), measured according to ISO5659-2 on a 3 mm thick plaque at 50 kW/m$^2$, and low heat release (MAHRE) measured according to ISO 5660-1 on a 3 mm thick plaque at 50 kW/m$^2$, while maintaining the advantageous properties of polycarbonates. Thus, polycarbonate compositions having impact properties within 20%, within 10%, within 5%, or within 1% of the same compositions without the PC-siloxane, polydialkylsiloxane, polyorganosiloxane-containing graft copolymer, or a combination thereof, can be manufactured. For example, the polycarbonate compositions can have an INI energy within 20%, within 10%, within 5%, or within 1% of the INI energy of the same composition, each measured at 23° C. at an impact energy of 5.5 J according to ISO 180 on Izod impact bars with a thickness of 4 mm.

Transportation components, in particular interior train components that are molded or extruded from the polycarbonate compositions are also provided. Molding can be by a variety of means such as injection molding, rotational molding, blow molding, and the like. In an embodiment, the molding is by injection molding. Illustrative claddings include, for example interior vertical surfaces, such as side walls, front walls, end-walls, partitions, room dividers, flaps, boxes, hoods and louvres; interior doors and linings for internal and external doors; window insulations, kitchen interior surfaces, interior horizontal surfaces, such as ceiling paneling, flaps, boxes, hoods and louvres; luggage storage areas, such as overhead and vertical luggage racks, luggage containers and compartments; driver's desk applications, such as paneling and surfaces of driver's desk; interior surfaces of gangways, such as interior sides of gangway membranes (bellows) and interior linings; window frames (including sealants and gaskets); (folding) tables with downward facing surface; interior and exterior surface of air ducts, and devices for passenger information (such as information display screens) and the like.

In an embodiment, the seat components and claddings meet certain criteria set forth in European Railway standard EN-45545 (2013). The European Union has approved the introduction of a set of fire testing standards for the railroad industry that prescribes certain flammability, flame spread rate, heat release, smoke emission, and smoke toxicity requirements for materials used in railway vehicles, known as European Railway standard EN-45545 (2013). Based on the vehicle material, end-use, and fire risks, 26 different "Requirement" categories for materials have been established (R1-R26). Seat components such as a back or base shell fall under the R6 application type. Lighting strips fall under the R3 application type. The R1 application type covers, amongst others, interior vertical surfaces, such as side walls, front walls, end-walls, partitions, room dividers, flaps, boxes, hoods and louvres; interior doors and linings for internal and external doors; window insulations, kitchen interior surfaces, interior horizontal surfaces, such as ceiling paneling, flaps, boxes, hoods and louvres; luggage storage areas, such as overhead and vertical luggage racks, luggage containers and compartments; driver's desk applications, such as paneling and surfaces of driver's desk; interior surfaces of gangways, such as interior sides of gangway membranes (bellows) and interior linings; window frames (including sealants and gaskets); (folding) tables with downward facing surface; interior and exterior surface of air ducts, and devices for passenger information (such as information display screens) and the like.

"Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g. in underground rail cars). For each application type, different test requirements for the hazard levels are defined. The testing methods, and smoke density and maximum heat release rate values for the various hazard levels in the European Railway standard EN-45545 (2013) are shown in Table 1A for R6 applications.

TABLE 1A

| | European Railways Standard EN 45545 for R6 applications | |
|---|---|---|
| Hazard Level | Smoke Density, DS-4 ISO 5659-2 at 50 kW/m$^2$ | Heat release, MAHRE (kW/m$^2$) ISO 5660-1 at 50 kW/m$^2$ |
| HL1 | ≤600 | — |
| HL2 | ≤300 | ≤90 |
| HL3 | ≤150 | ≤60 |

The testing methods, and smoke density, maximum heat release rate values and critical heat flux at extinguishment for the various hazard levels in the European Railway standard EN-45545 (2013) are shown in Table 1B for R1 applications.

TABLE 1B

| | European Railways Standard EN 45545 for R1 applications | | Critical heat flux at |
|---|---|---|---|
| Hazard Level | Smoke Density, DS-4 ISO 5659-2 at 50 kW/m$^2$ | Heat release, MAHRE (kW/m$^2$) ISO 5660-1 at 50 kW/m$^2$ | extinguishment (CFE) [kW/m$^2$] ISO 5658-2 |
| HL1 | ≤600 | — | >20 |
| HL2 | ≤300 | ≤90 | >20 |
| HL3 | ≤150 | ≤60 | >20 |

Data in the Examples shows that the compositions herein can meet the requirements for HL2, for both R1 and R6 applications.

While the compositions described herein are designed for use preferably in railway interiors, it is to be understood that the compositions are also useful in other interior components that are required to meet the test standards for HL2 for both R1 and R6 applications. Interior bus components are preferably mentioned. Current discussions directed to increasing bus safety include proposals to apply the HL2 standards to interior bus components. This invention accordingly includes interior bus components, including seat components and claddings as described above and comprising the preferred compositions described herein, and particularly below, that meet the tests specified in the HL2 standards described above.

In a particularly advantageous feature, the compositions described herein can meet other stringent standards for railway applications. For example, for interior applications used in the United States railway market, materials need to fulfill meet NFPA 130 (2010 edition). This standard imposes requirements on rate of smoke generation and surface flammability. The generation of smoke is measured via the ASTM E662-12 smoke density test and the requirements are a preferred smoke density after 1.5 min (Ds1.5) of 100 and less and a preferred smoke density after 4 min (Ds4) of 200 and less, in either flaming or non-flaming mode. Surface flammability is measured via the ASTM E162-12a flame spread test and the requirements are a maximum flame spread index (Is) of 35 and less, and no flaming running or dripping allowed. It is calculated from multiplying the flame spread factor (Fs) and the heat evolution factor (Q) determined during the test. Certain of the more preferred compositions described herein, and particularly below, can also meet these standards.

Set forth below are some embodiments of the railway components.

In an embodiment, a railway component, wherein the component is a molded or extruded interior train component comprises a polycarbonate composition comprising: a first polycarbonate selected from a linear polycarbonate homopolymer, a branched polycarbonate, a poly(carbonate-bisphenol arylate ester), a poly(aliphatic ester-carbonate), or a combination comprising at least one of the foregoing; a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the polycarbonate composition in an amount of 0.3 to 3 wt. %, based on the total weight of the polycarbonate composition; and 10 to 50 wt. % of glass fiber, based on the total weight of the polycarbonate composition; wherein a sample of the polycarbonate composition has: a smoke density after 4 minutes (DS-4) of less than or equal to 300 or 150 determined according to ISO 5659-2 on a 3 mm thick plaque at 50 kW/m$^2$, and a maximum average heat release (MAHRE) of equal to or less than 90 or 60 kW/m$^2$ measured according to ISO 5660-1 on a 3 mm thick plaque at 50 kW/m$^2$.

In another embodiment, a railway component, wherein the component is a molded or extruded interior train component comprises a polycarbonate composition comprising: a first polycarbonate selected from a linear polycarbonate homopolymer, a branched polycarbonate, a poly(carbonate-bisphenol arylate ester), or a combination comprising at least one of the foregoing; a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the composition in an amount of 0.3 to 3 wt. %, based on the total weight of the composition; and 10 to 50 wt. % of glass fiber, based on the total weight of the composition; wherein a sample of the polycarbonate composition has: a smoke density after 1.5 min (Ds 1.5) of less than or equal to 100 measured according to ASTM E662-12 in flaming and in non-flaming mode on a 3 mm thick plaque, smoke density after 4 min (Ds4) of less than or equal to 200 measured according to ASTM E662-12 in flaming and non-flaming mode on a 3 mm thick plaque, and a maximum flame spread index (Is) of 35 and less, without flaming running or dripping measured according to ASTM E162-12a on a 3 mm thick plaque.

For the foregoing embodiments, the first polycarbonate can comprise a linear polycarbonate homopolymer comprising repeating units of the formula

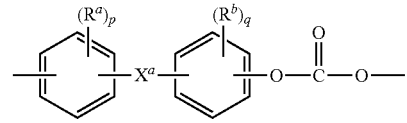

wherein $R^a$ and $R^b$ are each independently a $C_{1-12}$ alkyl group, $C_{1-12}$ alkenyl, $C_{3-8}$ cycloalkyl, or $C_{1-12}$ alkoxy, p and q are each independently integers of 0 to 4, and $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. An exemplary linear polycarbonate homopolymer comprises bisphenol A carbonate units. The linear polycarbonate has an average molecular weight of 18,000 to 25,000 g/mol; and the composition has a melt volume flow rate of about 8 to about 25 cc/10 min, measured at 300° C./1.2 Kg at 360 second dwell according to ISO 1133.

Alternatively, the first polycarbonate comprises a branched polycarbonate comprising repeating carbonate units of the formula:

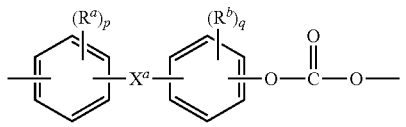
(1)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group, and greater than or equal to 0.2 mole %, based on the total moles of the branched polycarbonate, of moieties derived from a branching agent. The branching agent comprises trimellitic trichloride, 1,1,1-tris(4-hydroxyphenyl)ethane or a combination of trimellitic trichloride and 1,1,1-tris(4-hydroxyphenyl)ethane. In an embodiment, the branched polycarbonate comprises end-capping groups derived from an end-capping agent selected from phenol, p-t-butylphenol, p-methoxyphenol, p-cyanophenol, p-cumylphenol, or a combination comprising at least one of the foregoing.

The first polycarbonate can also comprise a poly(carbonate-bisphenol arylate ester) comprising bisphenol A carbonate units as the first repeating units and arylate ester units as the second repeating units, wherein the second repeating units are of the formula

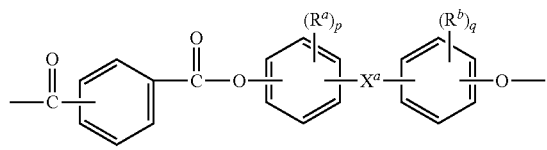

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. In an embodiment, $R^a$ and $R^b$ are each independently a $C_{1-3}$ alkyl, p and q are each independently 0 or 1, $X^a$ is alkylidene of formula —C($R_c$)($R^d$)— wherein $R^c$ and $R^d$ are each $C_{1-6}$ alkyl, and the ratio of the weight percent of the ester units to the carbonate units in the poly(carbonate-bisphenol arylate ester) is 50:50 to 99:1. Specific examples of the poly(carbonate-bisphenol arylate ester) include a poly(bisphenol A carbonate)-co-(bisphenol phthalate ester) comprising 55 to 65 wt. % of the ester units, wherein the ester units have a molar ratio of isophthalate to terephthalate of 45:55 to 55:45, a poly(bisphenol A carbonate)-co-(bisphenol phthalate ester) comprising 75 to 85 wt. % of the ester units, wherein the ester units have a molar ratio of isophthalate to terephthalate of 98:2 to 88:12.

In another embodiment, the first polycarbonate comprises a poly(aliphatic ester-carbonate) comprising bisphenol A sebacate ester units and bisphenol A carbonate units in a molar ratio of 2:98 to 8:92.

For the railway components of the foregoing embodiments, the second polymer can comprise a poly(carbonate-siloxane) copolymer comprising first repeating units and second repeating units, wherein the first repeating units are bisphenol carbonate units of the formula

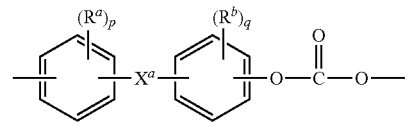

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and the second repeating units are polysiloxane units of the formula

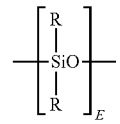

wherein R is each independently a $C_{1-13}$ monovalent hydrocarbon group, and E has an average value of 2 to 200.

The second repeating units can be siloxane units of the formulas

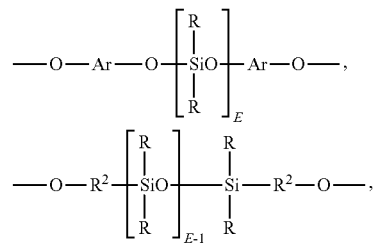

or a combination comprising at least one of the foregoing, wherein R is each independently a $C_{1-13}$ monovalent hydrocarbon group, Ar is each independently a $C_{6-30}$ aromatic group, $R^2$ is each independently a $C_{2-8}$ alkylene group, and E has an average value of 2 to 200. The second polymer is present in an amount effective to provide 0.3 wt. % to 3.0 wt. % siloxane based on the total weight of the polycarbonate composition.

The siloxane units can also be of the formula

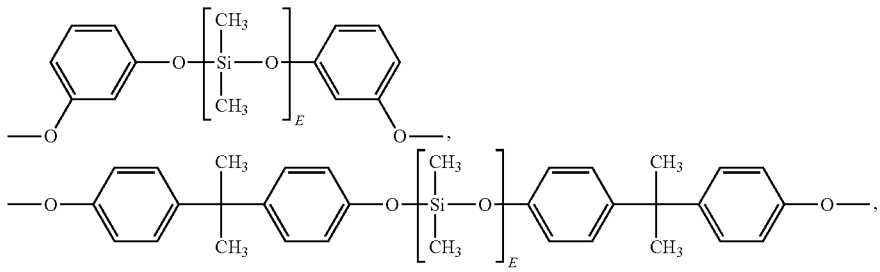

or a combination comprising at least one of the foregoing, wherein E has an average value of 2 to 200, or of the formula

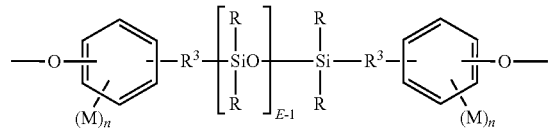

wherein R is each independently a $C_{1-13}$ monovalent hydrocarbon group, $R^3$ is independently a divalent $C_{2-8}$ aliphatic group, M is each independently a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, or a combination comprising at least one of the foregoing, n is each independently 0, 1, 2, 3, or 4, and E has an average value of 2 to 200, or of the formula

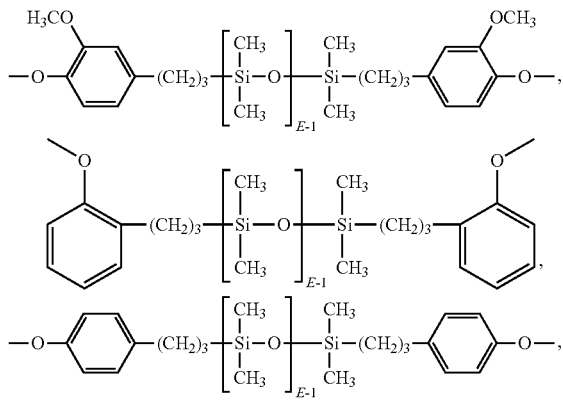

or a combination comprising at least one of the foregoing, wherein E has an average value of 2 to 200, for example 5 to 120.

Alternatively, the second polymer comprises polydialkylsiloxane having a viscosity from 10 to 100,000,000 mPa-s at 25° C., and wherein the alkyl groups each independently comprises 1 to 10 carbon atoms. For example, the polydialkylsiloxane is a polydimethylsiloxane having a viscosity from 50 to 1,000 mPa-s at 25° C.

In another embodiment, the second polymer comprises a silicone graft copolymer comprising a core comprising a polydiorganosiloxane and a vinyl-based monomer graft copolymerized with the core to form a shell.

For the polycarbonate compositions of the rail components, glass fiber has a length of about 1 to about 10 millimeters and a diameter of about 5 to about 20 micrometers. Glass fiber can be bonding glass fiber that bounds with a polycarbonate, a polyphenylene ether or a polyamide;

For the foregoing embodiments, when the glass fiber is present in an amount of 10 to 20 wt. %, based on the total weight of the composition, the component has: a tensile modulus of equal to or higher than 3400 MPa, measured according to ISO 527 at 5 mm/min and at 23° C., a tensile strength of equal to or higher than 50 MPa measured according to ISO 527 at 5 mm/min and at 23° C., an IZOD notched impact of equal to or higher than 5 $kJ/m^2$ measured according to ISO 180 at 5.5 J and at 23° C. on a 3 mm thick sample, and a density of equal to or lower than 1.36 $g/cm^3$ measured according to ISO 1183.

When the glass fiber is present in an amount of 20 to 30 wt. %, based on the total weight of the composition, the component has: a tensile modulus of equal to or higher than 5000 MPa, measured according to ISO 527 at 5 mm/min and at 23° C., a tensile strength of equal to or higher than 70 MPa measured according to ISO 527 at 5 mm/min and at 23° C., and an IZOD notched impact of equal to or higher than 5 $kJ/m^2$ measured according to ISO 180 at 5.5 J and at 23° C. on a 3 mm thick sample, and a density of equal to or lower than 1.45 $g/cm^3$ measured according to ISO 1183.

When the glass fiber is present in an amount of 30 to 40 wt. %, based on the total weight of the composition; and wherein the component has: a tensile modulus of equal to or higher than 7500 MPa, measured according to ISO 527 at 5 mm/min and at 23° C., a tensile strength of equal to or higher than 85 MPa measured according to ISO 527 at 5 mm/min and at 23° C., an IZOD notched impact of equal to or higher than 6 $kJ/m^2$ measured according to ISO 180 at 5.5 J and at 23° C. on a 3 mm thick sample, and a density of equal to or lower than 1.55 $g/cm^3$ measured according to ISO 1183.

When the glass fiber is present in an amount of 40 to 50 wt. %, based on the total weight of the composition; and wherein the component has: a tensile modulus of equal to or higher than 9500 MPa, measured according to ISO 527 at 5 mm/min and at 23° C., a tensile strength of equal to or higher than 90 MPa measured according to ISO 527 at 5 mm/min and at 23° C., an IZOD notched impact of equal to or higher than 7 kJ/m2 measured according to ISO 180 at 5.5 J and at 23° C. on a 3 mm thick sample, and a density of equal to or lower than 1.66 g/cm3 measured according to ISO 1183.

In an exemplary embodiment, the polycarbonate composition of the railway component comprises, based on the weight of the composition, 25 to 90 wt. % of a linear bisphenol A polycarbonate homopolymer; a poly(carbonate-siloxane), present in an amount wherein siloxane units in the second polymer are present in the polycarbonate composition in an amount of 0.3 to 3 wt. %, based on the total weight of the polymer composition; and comprising bisphenol A carbonate units, and siloxane units of the formula

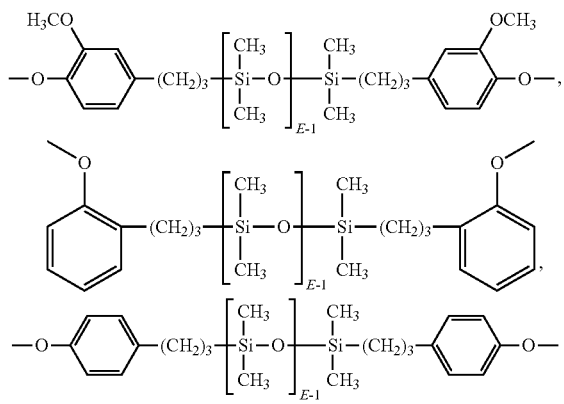

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 10 wt. % to 50 wt. % of glass fiber; wherein a sample of the polycarbonate composition has a smoke density after 4 minutes (DS-4) of less than or equal to 300 or 150 determined according to ISO 5659-2 on a 3 mm thick plaque at 50 kW/m$^2$ and a maximum average heat release (MAHRE) of equal to or less than 90 or 60 kW/m$^2$ measured according to ISO 5660-1 on a 3 mm thick plaque at 50 kW/m$^2$.

In another exemplary embodiment, the polycarbonate composition of the railway component comprises, based on the weight of the composition, 25 to 90 wt. % of a poly(bisphenol A carbonate)-co-(bisphenol phthalate ester) comprising 75 to 85 wt. % of the ester units, wherein the ester units have a molar ratio of isophthalate to terephthalate of 98:2 to 88:12; and a poly(carbonate-siloxane), present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

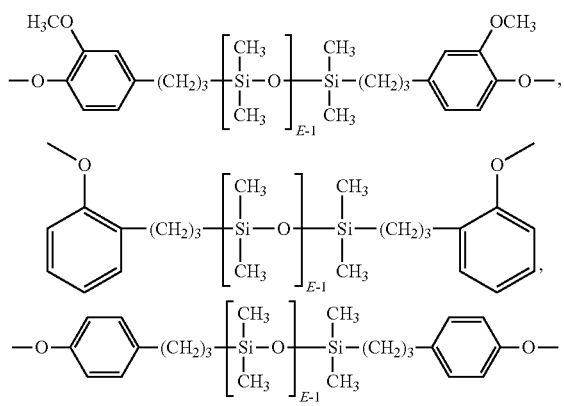

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 10 wt. % to 50 wt. % of glass fiber; wherein a sample of the polycarbonate composition has a smoke density after 4 minutes (DS-4) of less than or equal to 300 or 150 determined according to ISO 5659-2 on a 3 mm thick plaque at 50 kW/m$^2$ and a maximum average heat release (MAHRE) of equal to or less than 90 or 60 kW/m$^2$ measured according to ISO 5660-1 on a 3 mm thick plaque at 50 kW/m$^2$.

In another embodiment, the polycarbonate composition of the railway component comprises, based on the weight of the composition, 25 to 90 wt. % of a poly(aliphatic ester-carbonate) comprising bisphenol A sebacate ester units and bisphenol A carbonate units in a molar ratio of 2:98 to 8:92; and a poly(carbonate-siloxane), present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

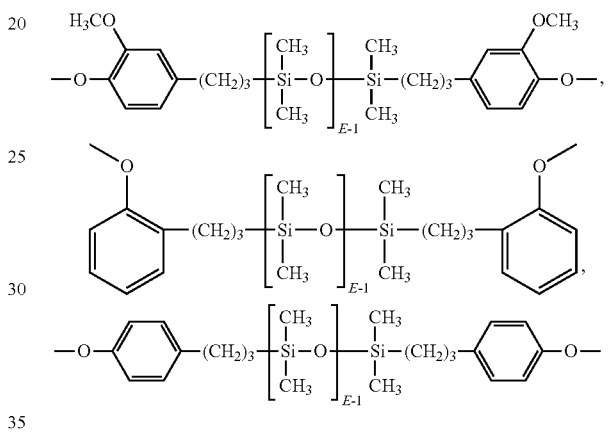

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 10 wt. % to 50 wt. % of glass fiber; wherein a sample of the polycarbonate composition has a smoke density after 4 minutes (DS-4) of less than or equal to 300 or 150 determined according to ISO 5659-2 on a 3 mm thick plaque at 50 kW/m$^2$ and a maximum average heat release (MAHRE) of equal to or less than 90 or 60 kW/m$^2$ measured according to ISO 5660-1 on a 3 mm thick plaque at 50 kW/m$^2$.

Alternatively, the polycarbonate composition of the railway component comprises, based on the weight of the composition, 32.5 to 90 wt. % of a of a linear bisphenol A polycarbonate homopolymer having a molecular weight of about 17,000 g/mol to about 23,000 g/mol as determined by gel permeation chromatography using polycarbonate standards; a poly(carbonate-siloxane) present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

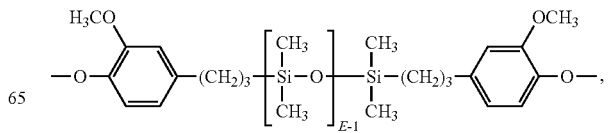

-continued

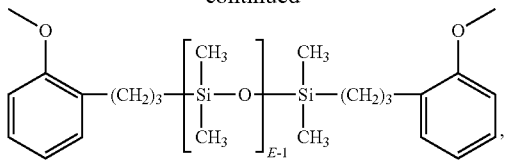

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 10 to 35 wt. % of glass fiber; and 0 to 5 wt. % of titanium dioxide; wherein a sample of the polycarbonate composition has a smoke density after 4 minutes (DS-4) of less than or equal to 300 or 150 determined according to ISO 5659-2 on a 3 mm thick plaque at 50 kW/m², and a maximum average heat release (MAHRE) of less than or equal to 90 or 60 kW/m² determined according to ISO 5660-1 on a 3 mm thick plaque at 50 kW/m².

In another embodiment, the polycarbonate composition of the railway component comprises, based on the weight of the composition, 32.5 to 90 wt. % of a of a linear bisphenol A polycarbonate homopolymer having a molecular weight of about 25,000 g/mol to about 35,000 g/mol as determined by gel permeation chromatography using polycarbonate standards; a poly(carbonate-siloxane) present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

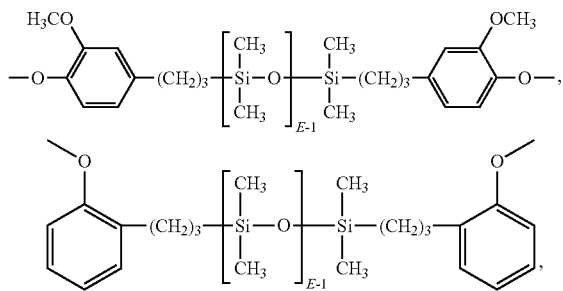

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 10 to 35 wt. % of glass fiber; and 0.5 to 5 wt. % of titanium dioxide; wherein a sample of the polycarbonate composition has a smoke density after 4 minutes (DS-4) of less than or equal to 300 or 150 determined according to ISO 5659-2 on a 3 mm thick plaque at 50 kW/m², and a maximum average heat release (MAHRE) of less than or equal to 90 or 60 kW/m² determined according to ISO 5660-1 on a 3 mm thick plaque at 50 kW/m².

In yet another exemplary embodiment, the polycarbonate composition of the railway component comprises, based on the weight of the composition, 25 to 90 wt. % of a poly (aliphatic ester-carbonate) comprising bisphenol A sebacate ester units and bisphenol A carbonate units in a molar ratio of 2:98 to 8:92; and a poly(carbonate-siloxane) present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

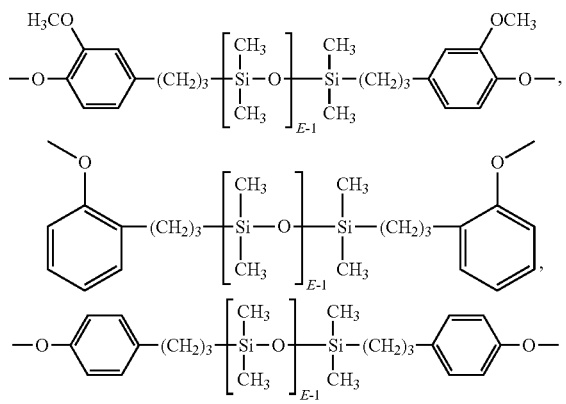

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 10 wt. % to 35 wt. % of glass fiber; and 0.2 to 5 wt. % of titanium dioxide; wherein a sample of the polycarbonate composition has a smoke density after 4 minutes (DS-4) of less than or equal to 300 or 150 determined according to ISO 5659-2 on a 3 mm thick plaque at 50 kW/m² and a maximum average heat release (MAHRE) of less than or equal to 90 or 60 kW/m² determined according to ISO 5660-1 on a 3 mm thick plaque at 50 kW/m².

The foregoing polycarbonate compositions of the railway components can further comprises one or more of the following: (i) 0.2 to 10 wt. % of titanium dioxide; (ii) an aromatic organophosphorus compound having at least one organic aromatic group and at least one phosphorus-containing group, or an organic compound having at least one phosphorus-nitrogen bond; or (iii) no more than 5 wt. % based on the weight of the composition of a processing aid, a heat stabilizer, an antioxidant, an ultra violet light absorber, a colorant, or a combination comprising at least one of the foregoing. In an embodiment, no or substantially no brominated polycarbonate is present in the polycarbonate composition.

The organophosphorus compound can be bisphenol A bis (diphenyl phosphate), triphenyl phosphate, resorcinol bis (diphenyl phosphate), tricresyl phosphate, a phenol/bi-phenol polyphosphate, or a combination comprising at least one of the foregoing. Alternatively, the organophosphorus compound containing a nitrogen-phosphorus bond is a phosphazene, phosphorus ester amide, phosphoric acid amide, phosphonic acid amide, phosphinic acid amide, tris(aziridinyl)phosphine oxide, a combination comprising at least one of the foregoing. When present, the organophosphorus compound is effective to provide phosphorus in an amount of 0.1% to 1.0% of phosphorus, based on the weight of the polycarbonate composition.

The foregoing railway components can be a seat component, table tray, head rest, privacy divider, center console, arm rest, leg rest, food tray, end bay, shroud, kick panel, foot well, literature pocket, monitor, bezel, line replaceable unit, foot bar, luggage rack, luggage container, luggage compartment, floor and wall composite, air duct, strip, device for passenger information, window frame, interior lining, interior vertical surface, interior door, lining for internal and external door, interior horizontal surface, electrical and lighting component. The seat component can be a primary seat structure, a seat shell, a seat back, or a seat pan. The interior vertical surface can comprise side walls, front walls, end walls, partitions, room dividers, flaps, boxes, hoods and louvres, and the interior horizontal surface comprises ceiling paneling, flaps, boxes, hoods, and louvres. The railway components can be an extruded or molded interior train cladding.

Compositions having low smoke density and low heat release rates are further illustrated by the following non-limiting examples.

EXAMPLES

The materials used in the Examples are described in Table 2A.

TABLE 2A

| Component | Chemical Description | Source |
|---|---|---|
| PC1 | Linear Bisphenol A Polycarbonate, produced via interfacial polymerization, Mw of about 30,000 g/mol as determined by GPC using polycarbonate standards, phenol end-capped | SABIC |
| PC2 | Linear Bisphenol A Polycarbonate, produced via interfacial polymerization, Mw of about 21,800 g/mol as determined by GPC using polycarbonate standards, phenol end-capped | SABIC |
| PC3 | Branched Bisphenol A Polycarbonate, produced via interfacial polymerization, 3 mol % 1,1,1-tris(4-hydroxyphenyl)ethane (THPE) branching agent, Mw about 28,700 g/mol as determined by GPC using polycarbonate standards, cyanophenol end-capped | SABIC |
| PC4 | Branched Bisphenol A polycarbonate, produced via interfacial polymerization, 0.3 mol % 1,1,1-tris(4-hydroxyphenyl)ethane (THPE) branching agent, Mw about 33,600 g/mol as determined by GPC using polycarbonate standards, para-cumylphenol (PCP) end-capped | SABIC |
| PC5 | Linear Bisphenol A Polycarbonate, produced via interfacial polymerization, Mw of about 18,800 g/mol as determined by GPC using polycarbonate standards, para-cumylphenyl (PCP) end-capped | SABIC |
| SiPC1 | PDMS (polydimethylsiloxane)-Bisphenol A Polycarbonate copolymer, produced via interfacial polymerization, 6 mol % siloxane, average PDMS block length of 45 units (D45), Mw about 23,000 g/mol as determined by GPC using polycarbonate standards, para-cumylphenol (PCP) end-capped | SABIC |
| SiPC2 | PDMS (polydimethylsiloxane)-Bisphenol A Polycarbonate copolymer, produced via interfacial polymerization, 20 mol % siloxane, average PDMS block length of 45 units (D45), Mw about 30,000 g/mol as determined by GPC using polycarbonate standards, para-cumylphenol (PCP) end-capped | SABIC |
| PC-Ester | Poly(phthalate-carbonate) copolymer, produced via interfacial polymerization, about 81 mol % ester units, Mw about 28,500 g/mol as determined via GPC using polycarbonate standards, para-cumylphenol (PCP) end-capped | SABIC |
| HFD | Sebacic acid-bisphenol A polyestercarbonate, produced via interfacial polymerization, about 6.0 mol % sebacic acid, Mw about 21,400 g/mol as determined via GPC using polycarbonate standards, para-cumylphenol (PCP) end-capped | SABIC |
| 105B | TetrabromoBPA/bisphenol A polycarbonate copolymer, bromine content of 26 wt. %, Mw about 23,700 g/mol, para-cumyl phenol end-capped | SABIC |
| BPADP | Bisphenol A diphosphate | Nagase (Europe) GmbH |
| PDMS | Polydimethylsiloxane (PDMS) oil, M1000 (1000 cps) | MOMENTIVE |
| MR01 | Silicone core-shell graft copolymer, KANE ACE ™ MR-01 | KANEKA |
| KSS | Potassium 3-(phenylsulfonyl)benzenesulfonate | Sloss Industries Corporation |
| Rimar | Potassium nonafluoro-1-butanesulfonate | Lanxess Germany |
| OPCTS | Octaphenylcyclotetrasiloxane | MOMENTIVE |
| PPMS | Polyphenylmethylsiloxane oil, PN200 | MOMENTIVE |
| STB | 2,4,5-trichlorobenzene sodium sulfonate | Sloss |
| $TiO_2$ | Coated titanium dioxide | DuPont Titanium |
| Carbon black | Amorphous Carbon | Cabot |
| IRGAFOS 168 | Tris(di-t-butylphenyl)phosphite | BASF |
| GF1 | Chopped glass (aluminum borosilicate) fiber, bonding (with sizing) for polycarbonate, fiber length of 2-5 mm, fiber diameter of 12.0-15.5 μm | Nippon Electric Glass |
| GF2 | Chopped glass (aluminum borosilicate) fiber, non-bonding (without sizing) for polycarbonate, fiber length of 2-5 mm, fiber diameter of 12.0-15.5 μm | Nippon Electric Glass |
| GF3 | Chopped glass (aluminum borosilicate) fiber, bonding (with sizing) for polyphenylene ether, fiber length of 3-5 mm, fiber diameter of 14 μm | Owens Corning |
| GF4 | Chopped glass (aluminum borosilicate) fiber, bonding (with sizing) for polyamide, fiber length of 2-5.5 mm, fiber diameter of 10 μm | PPG Industries |

The tests performed are summarized in Table 2B.

TABLE 2B

| Description | Test | Conditions | Specimen | Property | Units |
|---|---|---|---|---|---|
| ISO Smoke density | ISO 5659-2 | 50 kW/m² | plaque 75 × 75 × 3 mm | DS-4 | [—] |
| ISO Heat release | ISO 5660-1 | 50 kW/m² | plaque 100 × 100 × 3 mm | MAHRE | kW/m² |
| ASTM smoke density | ASTM E662 | 25 kW/m² | plaque 75 × 75 × 3 mm | DS-1.5 DS-4 | [—] |
| Melt volume rate | ISO 1133 | 300° C., 1.2 kg, dwell time 300 s | Pellets | MVR | cm³/10 min |
| Density | ISO 1183 | 23° C. | Multi-purpose ISO 3167 Type A, 4 mm thickness | Density | g/cm³ |
| Izod impact | ISO 180 | Various temperatures, 5.5 J | Multi-purpose ISO 3167 Type A, 3 mm thickness | INI (notched), IUI (un-notched) | kJ/m² |
| Tensile test | ISO 527 | 23° C., 5 mm/min | Multi-purpose ISO 527 tensile bar | TS (tensile strength), TM (tensile modulus) | MPa |
| Flexural test | ISO 178 | 23° C., 2 mm/min | Multi-purpose ISO 3167 Type A, 4 mm thickness | FS (flexural strength), FM (flexural modulus) | MPa |

Blending, Extrusion, and Molding Conditions

The compositions were made as follows. All solid additives (e.g., stabilizers, colorants, solid flame retardants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The glass fibers were fed using a side feeder. The liquid flame retardants (e.g., BPADP) were fed before the vacuum using a liquid injection system. It will be recognized by one skilled in the art that the method is not limited to these temperatures or processing equipment.

Extrusion of all materials was performed on a 25 mm Werner-Pfleiderer ZAK twin-screw extruder (L/D ratio of 33/1) with a vacuum port located near the die face. The extruder has 9 zones, which were set at temperatures of 40° C. (feed zone), 200° C. (zone 1), 250° C. (zone 2), 270° C. (zone 3) and 280-300° C. (zone 4 to 8). Screw speed was 300 rpm and throughput was between 15 and 25 kg/hr. It will be recognized by one skilled in the art that the method is not limited to these temperatures or processing equipment.

The compositions were molded after drying at 120° C. for 2 hours on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

ISO smoke density measurements were performed on 7.5× 7.5 cm plaques with 3 mm thickness using an NBS Smoke Density Chamber from Fire Testing Technology Ltd (West Sussex, United Kingdom). All measurements were performed according to ISO 5659-2, with an irradiance of 50 kW/m² at the sample position and a sample-to-cone distance of 5 cm in view of the charring behavior of the samples (as prescribed by ISO 5659-2). DS-4 was determined as the measured smoke density after 240 seconds. The tests executed are indicative tests. They were performed according to the ISO5659-2 standard, but were not executed by an officially certified test institute.

ISO heat release measurements were performed on 10×10 cm plaques with 3 mm thickness using a Cone calorimeter. All measurements were performed according to ISO 5660-1, with 50 kW/m² irradiance at the sample position and a sample-to-cone distance of 6 cm in view of the charring behavior of the samples (as prescribed by ISO 5660-1). Heat release is measured as MAHRE in kW/m² as prescribed by ISO5660-1. The tests executed are indicative tests, and were executed by an officially certified test institute.

Smoke density testing for NFPA 130 was performed on 7.5×7.5 cm plaques of 3 mm thickness according to ASTM E662-12 measured in both flaming and non-flaming mode. Smoke density (Ds) at 1.5 min (Ds1.5) and after 4.0 minutes (Ds4) was reported. The tests executed are indicative tests. They were performed according to the ISO5659-2 standard, but were not executed by an officially certified test institute.

Siloxane content is a weight percent calculated by dividing the total siloxane weight in a composition over the total weight of the polymer composition.

Examples 1-7

These examples demonstrate the effect of polydimethylsiloxane/bisphenol A polycarbonate copolymer (SiPC1) addition to compositions containing 15% glass fiber and linear bisphenol A polycarbonate (PC1). In all these examples, non-bonding glass for polycarbonate (GF2) was used. Formulations and results are shown in Table 3. The results are also illustrated graphically in FIG. 1.

TABLE 3

| Component | Unit | CEx1 | Ex2 | Ex3 | Ex4 | Ex5 | Ex6 | CEx7 |
|---|---|---|---|---|---|---|---|---|
| PC1 | Wt. % | 84.95 | 79.19 | 74.35 | 69.03 | 63.75 | 42.46 | |
| SiPC1 | Wt. % | | 5.73 | 10.6 | 15.92 | 21.2 | 42.46 | 84.92 |
| Irgafos 168 | Wt. % | 0.05 | 0.08 | 0.05 | 0.05 | 0.05 | 0.08 | 0.08 |
| GF2 | Wt. % | 15 | 15 | 15 | 15 | 15 | 15 | 15 |

TABLE 3-continued

| Component | Unit | CEx1 | Ex2 | Ex3 | Ex4 | Ex5 | Ex6 | CEx7 |
|---|---|---|---|---|---|---|---|---|
| SiPC1 content in polymer composition | Wt. % | 0 | 6.7 | 12.5 | 18.7 | 25.0 | 50.0 | 100.0 |
| Property | | | | | | | | |
| Smoke density, DS-4 | — | 507 | 206 | 213 | 188 | 218 | 222 | 398 |

Comparative example 1 shows that a composition containing 15% GF2 in PC1 has a too high smoke density to be suitable for EN45545 R1 or R6 applications with a Ds-4 of 500 measured according to ISO 5659-2 at 50 kW/m$^2$ on a 3 mm thick plaque (requirement for HL2 compliance for R1 or R6 applications is DS-4<300 at 50 kW/m$^2$). Same is the case for a composition containing 15% GF2 composition in pure SiPC1 (CEx7). However, upon the addition of small quantities of SiPC1 to the GF2-PC1 composition (as low as 6.7 wt % of the polymer content), significant reductions in DS-4 below 300 are achieved, with Ds-4 values between 188 and 222 measured according to ISO 5659-2 at 50 kW/m$^2$ on a 3 mm thick plaque, which meets the smoke density requirements (requirement for HL2 compliance is DS-4<300 at 50 kW/m$^2$) for R1 or R6 compliance for Hazard Level 2 (provided the other requirements are met). This is the case for SiPC1 loadings up to 50% of the polymer content (Ex3-Ex6), which allows the use of a broad range of SiPC1 loadings.

Examples 8-14

Figure 2:
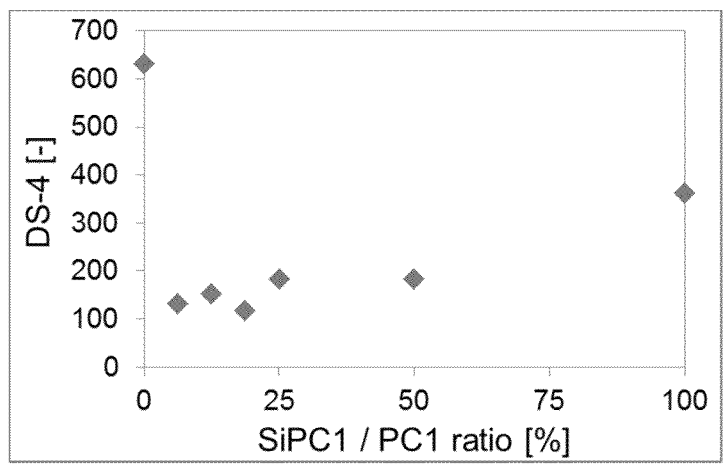
FIG. 2 shows the effect of increasing SiPC1/PC1 ratio smoke density (Ds-4) for a composition containing 30% glass fiber.

These examples demonstrate the effect of polydimethylsiloxane/bisphenol A polycarbonate copolymer (SiPC1) addition to compositions containing 30% glass fiber and linear bisphenol A polycarbonate (PC1). In all these examples, non-bonding glass for polycarbonate (GF2) was used. Formulations and results are shown in Table 4. FIG. 2 summarize this data graphically.

of 360. However, upon the addition of small quantities of SiPC1 to the GF2-PC1 composition (as low as 6.3% of the polymer content), significant reductions in DS-4 below 300 are achieved with Ds-4 values between 116 and 182 measured according to ISO 5659-2 at 50 kW/m$^2$ on a 3 mm thick plaque, allowing meeting smoke density requirements for R1 or R6 applications (DS-4<300 at 50 kW/m$^2$). This is the case for SiPC1 loadings up to 50% of the polymer content (Ex9-Ex13). There is an optimum SiPC1 loading level, as shown in FIG. 2, which allows DS-4 values close or below 150. The optimum loading is between 6.3 and 18.7% of the polymer content measured according to ISO 5659-2 at 50 kW/m$^2$ on a 3 mm thick plaque, allowing smoke density values close to or below the requirement for HL3 compliance for R1 or R6 applications (DS-4<150 at 50 kW/m$^2$). At higher SiPC1 loadings, DS-4 values increase again. Overall, these results show that the addition of SiPC1 to a composition containing glass fiber and linear BPA polycarbonate can result in significant reductions in smoke density to levels below the HL2 threshold of Ds-4 at or below 300 at 50 kW/m$^2$ for R1 or R6 applications (provided the other requirements are met) or even below the HL3 threshold of Ds-4 at or below 150 at 50 kW/m$^2$.

Examples 15-21

These examples show the effect of the glass fiber loading on the smoke density of compositions comprising linear

TABLE 4

| Component | Unit | CEx8 | Ex9 | Ex10 | Ex11 | Ex12 | Ex13 | CEx14 |
|---|---|---|---|---|---|---|---|---|
| PC1 | Wt. % | 69.95 | 65.6 | 61.25 | 56.9 | 52.5 | 35 | |
| SiPC1 | Wt. % | | 4.4 | 8.7 | 13.1 | 17.5 | 35 | 69.95 |
| Irgafos 168 | Wt. % | 0.05 | 0.05 | 0.05 | 0.05 | 0.05 | 0.05 | 0.05 |
| GF2 | Wt. % | 30 | 30 | 30 | 30 | 30 | 30 | 30 |
| SiPC1 content in polymer composition | % | 0 | 6.29 | 12.4 | 18.7 | 25 | 50 | 100 |
| Property | | | | | | | | |
| Smoke density, DS-4 | — | 631 | 130 | 151 | 116 | 182 | 182 | 361 |

Figure 3:
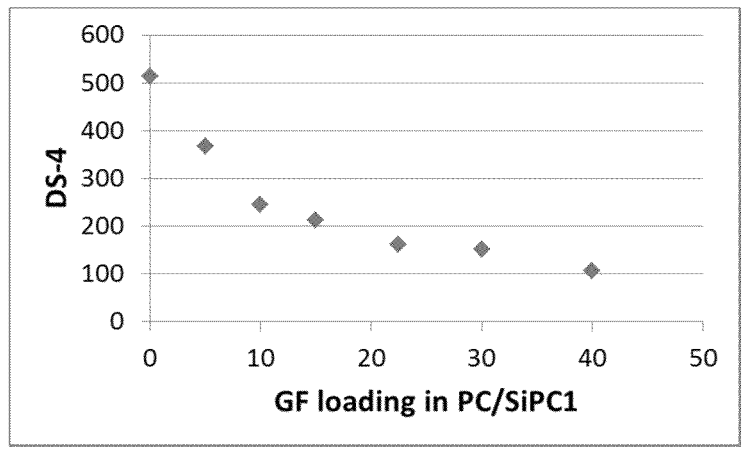
FIG. 3 shows the effect of glass fiber loading level on smoke density (Ds-4) for a composition containing PC1 and SiPC1.

Comparative example 8 shows that a composition containing 30% GF2 in PC1 has a too high smoke density (Ds-4 of 630 measured according to ISO 5659-2 at 50 kW/m$^2$ on a 3 mm thick plaque) to be suitable for EN45545 R1 or R6 applications (requirement for HL2 compliance for R1 or R6 applications is DS-4<300 at 50 kW/m$^2$). Same is the case for a composition containing 30% GF2 in pure SiPC1 with a Ds-4 bisphenol A polycarbonate (PC1) and polydimethylsiloxane/bisphenol A polycarbonate copolymer (SiPC1). In all these examples, non-bonding glass for polycarbonate was used (GF2). The SiPC1 content in the polymer composition was kept same for all examples, namely 12.5 wt % of the total polymer composition. Formulations and results are shown in Table 5. FIG. 3 summarize this data graphically.

TABLE 5

| Component | Unit | CEx15 | CEx16 | Ex17 | Ex18 | Ex19 | Ex20 | Ex21 |
|---|---|---|---|---|---|---|---|---|
| PC1 | Wt. % | 87.43 | 83.05 | 78.68 | 74.35 | 67.77 | 61.25 | 52.43 |
| SiPC1 | Wt. % | 12.49 | 11.87 | 11.24 | 10.6 | 9.68 | 8.7 | 7.49 |
| Irgafos 168 | Wt. % | 0.08 | 0.08 | 0.08 | 0.05 | 0.05 | 0.05 | 0.08 |
| GF2 | Wt. % | 0 | 5 | 10 | 15 | 22.5 | 30 | 40 |
| SiPC1 content in polymer composition | % | 12.5 | 12.5 | 12.5 | 12.5 | 12.5 | 12.44 | 12.5 |
| Property | | | | | | | | |
| Smoke density, DS-4 | — | 513 | 368 | 273 | 213 | 161 | 151 | 106 |

The compositions containing PC1 and SiPC1 without GF2 (CEx15) or with only 5 wt % GF2 (CEx16) do not have a smoke density value below the threshold of the HL2 requirements for R1 or R6 applications (Ds-4<300 at 50 kW/m$^2$), all measured according to ISO 5659-2 at 50 kW/m$^2$ on a 3 mm thick plaque. At GF2 loading of 10% and higher (up to 40 wt %, Ex17-21) in a composition containing PC1 and SiPC1, smoke density values below 300 are achieved at 50 kW/m$^2$ meeting the HL2 requirement for R1 or R6 applications (Ds4<300 at 50 kW/m$^2$). Addition of higher GF2 contents of 30% and higher reduces the smoke density even further, resulting in smoke density values close to or below the requirement for HL3 compliance for R1 or R6 applications (DS-4<150 at 50 kW/m$^2$). Extrapolation of the data suggests that at 50% GF2 loading, smoke density Ds-4 values below 100 would be obtained. As such, a broad range of glass fiber loadings can be employed to meet other material requirements, such as stiffness, strength, impact, density, and flow, while meeting the HL2 threshold of Ds-4 at or below 300 at 50 kW/m$^2$ for R1 or R6 applications (provided the other requirements are met) or even the HL3 threshold of Ds-4 at or below 150 at 50 kW/m$^2$.

Examples 22-27

These examples show the effect of the source of siloxane on the smoke density of compositions comprising linear bisphenol A polycarbonate (PC1) and 30% glass fiber. In all these examples, non-bonding glass for polycarbonate was used (GF2). Formulations and results are shown in Table 6.

TABLE 6

| Component | Unit | CEx22 | Ex23 | Ex24 | Ex25 | CEx26 | CEx27 |
|---|---|---|---|---|---|---|---|
| PC1 | Wt. % | 69.92 | 61.18 | 67.3 | 69.438 | 69.04 | 69.04 |
| SiPC1 | Wt. % | | 8.74 | | | | |
| SiPC2 | Wt. % | | | 2.62 | | | |
| PDMS | Wt. % | | | | 0.482 | | |
| PPMS | Wt. % | | | | | 0.88 | |
| OPCTS | Wt. % | | | | | | 0.88 |
| IRGAFOS 168 | Wt. % | 0.08 | 0.08 | 0.08 | 0.08 | 0.08 | 0.08 |
| GF2 | Wt. % | 30 | 30 | 30 | 30 | 30 | 30 |
| Siloxane content in the polymer composition | | 0 | 0.75 | 0.75 | 0.75 | | |
| Property | | | | | | | |
| DS-4 | — | 631 | 151 | 157 | 181 | 620 | 520 |

Comparative example 22 shows that a composition containing 30% GF2 in PC1 has a too high smoke density (Ds-4 of 630 measured according to ISO 5659-2 at 50 kW/m$^2$ on a 3 mm thick plaque) to be suitable for EN45545 R1 or R6 applications (requirement for HL2 compliance for R1 or R6 applications is DS-4<300 at 50 kW/m$^2$).

Upon the addition of small quantities of aliphatic siloxanes (all added in quantities to achieve the same siloxane content in the polymer composition of 0.75 wt %), namely SiPC1 (Ex23), SiPC2 (Ex24) or PDMS (Ex25), significant reductions in DS-4 below 300 are achieved with Ds-4 values between 150 and 200 measured according to ISO 5659-2 at 50 kW/m$^2$ on a 3 mm thick plaque, allowing meeting smoke density requirements for R1 or R6 applications (DS-4<300 at 50 kW/m$^2$). For SiPC1 and SiPC2 provided at similar siloxane content, smoke densities are similar, demonstrating that the type of PC-PDMS copolymer is not significant. PDMS provides a slightly higher smoke density at the same siloxane content, but values are acceptable and still allowing meeting smoke density requirements for R1 or R6 applications (DS-4<300 at 50 kW/m$^2$). On the other hand, aromatic siloxanes have hardly any effect on smoke density and are not efficient in reducing Ds-4, comparing Ds-4 of 620 for polymethylphenylsiloxane (CEx26) and of 520 for octaphenylcyclotetrasiloxane (CEx27) to Ds-4 of 631 for the composition without any siloxane (CEx22). Accordingly, the results demonstrate that aliphatic siloxanes reduce smoke density, and not aromatic ones. This is contradictory to commonly applied flame retardant (FR) approaches in polycarbonate for UL performance, where typically aromatic siloxanes, such as polymethylphenylsiloxane or octaphenylcyclotretrasiloxane are used, but not aliphatic ones.

Examples 28-34

These examples show the effect of different flame retardant additives on the smoke density of compositions comprising linear bisphenol A polycarbonate (PC1) and glass fiber. In all these examples, non-bonding glass for polycarbonate (GF2) was used. Formulations and results are shown in Table 7.

TABLE 7

| Component | Unit | CEx28 | Ex29 | CEx30 | CEx31 | CEx32 | CEx33 | CEx34 |
|---|---|---|---|---|---|---|---|---|
| PC1 | Wt. % | 69.92 | 61.2 | 69.67 | 69.84 | 69.42 | 57.92 | 64.92 |
| SiPC1 | Wt. % | | 8.74 | | | | | |
| KSS | Wt. % | | | 0.25 | | | | |
| RIMAR Salt | Wt. % | | | | 0.08 | | | |
| STB | Wt. % | | | | | 0.5 | | |
| 105B | Wt. % | | | | | | 12 | |
| BPADP | Wt. % | | | | | | | 5 |
| IRGAFOS 168 | Wt. % | 0.08 | 0.08 | 0.08 | 0.08 | 0.08 | 0.08 | 0.08 |
| GF2 | Wt. % | 30 | 30 | 30 | 30 | 30 | 30 | 30 |
| Property | | | | | | | | |
| DS-4 | — | 631 | 151 | 585 | 654 | 451 | 353 | 556 |

Comparative example 28 shows that a composition containing 30% GF2 in PC1 has a too high smoke density (Ds-4 of 630 measured according to ISO 5659-2 at 50 kW/m² on a 3 mm thick plaque) to be suitable for EN45545 R1 or R6 applications (requirement for HL2 compliance for R1 or R6 applications is DS-4<300 at 50 kW/m²). Upon the addition of small quantities of SiPC1 (Ex29), significant reductions in DS-4 below 300 are achieved with Ds-4 value around 150 measured according to ISO 5659-2 at 50 kW/m² on a 3 mm thick plaque, allowing meeting smoke density HL2 requirements for R1 or R6 applications (DS-4<300 at 50 kW/m²). Surprisingly, none of the other tested flame retardant additives is able to achieve a similar effect. Addition of sulphonated FR salts, such as KSS (CEx30), Rimar (CEx31) and STB (CEx32) does not result in significant changes in smoke density with Ds-4 values above 450, far from the smoke density HL2 requirements for R1 or R6 applications (DS-4<300 at 50 kW/m2. The addition of brominated polycarbonate (105B) (CEx33) does give reductions in smoke density, but not significant enough to reduce the Ds-4 value well below the 300 or 150 thresholds for HL2 or HL3 compliance for R1 or R6 applications. BPADP addition (CEx34) also has no positive effect on the smoke density with smoke density Ds-4 values of 556, very similar to the composition without BPADP (CEx8).

These examples demonstrate that the positive effect of SiPC1 or PDMS addition to glass fiber filled polycarbonate compositions with respect to the reduction of smoke density is remarkable and unexpected, and cannot be met by any other common flame retardant additives for polycarbonates, especially since all common FR agents for polycarbonate are not efficient in reducing smoke density.

The results are summarized in FIG. 4, which illustrates the unique effect of aliphatic siloxanes on the smoke density of a composition containing polycarbonate and 30% GF2.

Examples 35-38

These examples show the effect of polydimethylsiloxane/bisphenol A polycarbonate copolymer (SiPC1) on the smoke density of compositions comprising branched bisphenol A polycarbonates (PC3 and PC4) and glass fiber. In all these examples, non-bonding glass for polycarbonate (GF2) was used. Formulations and results are shown in Table 8.

TABLE 8

| | Unit | CEx35 | Ex36 | CEx37 | Ex38 |
|---|---|---|---|---|---|
| Component | | | | | |
| PC3 | Wt. % | 69.92 | 61.2 | | |
| PC4 | | | | 69.92 | 61.2 |
| SiPC1 | Wt. % | | 8.75 | | 8.75 |
| IRGAFOS 168 | Wt. % | 0.08 | 0.08 | 0.08 | 0.08 |
| GF2 | Wt. % | 30 | 30 | 30 | 30 |
| SiPC1 content in polymer composition | % | 0.00 | 12.51 | 0.00 | 12.51 |
| Property | | | | | |
| DS4 AVG | — | 388 | 118 | 529 | 122 |

The compositions containing only GF2 and PC3 (CEx35) or PC4 (CE37) do not have a smoke density value below the threshold of the HL2 requirements for R1 or R6 applications (Ds-4<300 at 50 kW/m²), all measured according to ISO 5659-2 at 50 kW/m² on a 3 mm thick plaque, and as such are not suitable for train interior components under R1 or R6 categories.

Examples 36 (PC3) and 38 (PC4) show that the positive effect of addition of SiPC1 is also applicable to different types of branched polycarbonate. The compositions containing the branched polycarbonate, 30% GF2 and SiPC1 meet HL2 or HL3 smoke density requirements for R1 or R6 applications (Ds-4<300 at 50 kW/m² for HL2, Ds-4<150 at 50 kW/m² for HL3). This demonstrates that the effect of SiPC1 is translatable to branched polycarbonates as well.

Examples 39-46

These examples demonstrate the effect of TiO₂ addition on the smoke density of compositions comprising polycarbonate (PC1 or PC2), polydimethylsiloxane/bisphenol A polycarbonate copolymer (SiPC1), and glass fiber (GF1 or GF2). Formulations and results are shown in Table 10.

TABLE 10

| Component | Unit | Ex39 | Ex40 | Ex41 | Ex42 | Ex43 | Ex44 | Ex45 | Ex46 |
|---|---|---|---|---|---|---|---|---|---|
| PC1 | Wt. % | 74.35 | 72.47 | 61.21 | 59.34 | 52.45 | 50.87 | | |
| PC2 | Wt. % | | | | | | | 61.18 | 59.34 |
| SiPC1 | Wt. % | 10.6 | 10.35 | 8.74 | 8.48 | 17.5 | 16.96 | 8.74 | 8.48 |
| Irgafos 168 | Wt. % | 0.05 | 0.05 | 0.05 | 0.08 | 0.05 | 0.08 | 0.08 | 0.08 |
| GF1 | Wt. % | | | | | | | 30 | 30 |
| GF2 | Wt. % | 15 | 15 | 30 | 30 | 30 | 30 | | |
| $TiO_2$ | Wt. % | | 2 | | 2 | | 2 | | 2 |
| CB | Wt. % | | 0.1 | | 0.1 | | 0.1 | | 0.1 |
| SiPC1 content in polymer composition | % | 12.5 | 12.5 | 12.5 | 12.5 | 25.0 | 25.0 | 12.5 | 12.5 |
| Property | | | | | | | | | |
| Smoke density, DS-4 | — | 213 | 129 | 151 | 93 | 182 | 99 | 266 | 125 |
| Delta Ds-4 w/$TiO_2$ | % | — | −39 | — | −38 | — | −46 | — | −53 |

A comparison of the compositions with and without $TiO_2$ but otherwise having the same components shows that the addition of $TiO_2$ further reduces the smoke density compared to the same composition without $TiO_2$. A decrease of 35-55% in smoke density is achieved, changing the Ds-4 values from between 150-300 (measured according to ISO 5659-2 at 50 kW/m² on a 3 mm thick plaque), which meets HL2 requirements on smoke density for R1 or R6 applications (Ds-4<300 at 50 kW/m²) for compositions without $TiO_2$ to Ds-4 values between 90-130, which meets HL3 requirements on smoke density for R1 or R6 applications (Ds-4<150 at 50 kW/m²) for compositions containing $TiO_2$. As such, compositions containing $TiO_2$ are capable of meeting HL3 requirements for R1 or R6 applications (provided the other requirements are met as well).

Examples 47-54

These examples demonstrate the effect of glass fiber type at 15% and 30% loading levels in compositions containing polycarbonate (PC1) and 12.5% of polydimethylsiloxane/bisphenol A polycarbonate copolymer (SiPC1) on smoke density and mechanical properties. Formulations and results are shown in Table 11.

TABLE 11

| Component | Unit | Ex47 | Ex48 | Ex49 | Ex50 | Ex51 | Ex52 | Ex53 | Ex54 |
|---|---|---|---|---|---|---|---|---|---|
| PC1 | Wt. % | 61.21 | 61.21 | 61.21 | 61.21 | 74.33 | 74.3 | 74.33 | 74.33 |
| SiPC1 | Wt. % | 8.74 | 8.74 | 8.74 | 8.74 | 10.62 | 10.6 | 10.62 | 10.62 |
| IRGAFOS 168 | Wt. % | 0.05 | 0.05 | 0.05 | 0.05 | 0.05 | 0.05 | 0.05 | 0.05 |
| GF1 | Wt. % | 30 | | | | 15 | | | |
| GF2 | Wt. % | | 30 | | | | 15 | | |
| GF3 | Wt. % | | | 30 | | | | 15 | |
| GF4 | Wt. % | | | | 30 | | | | 15 |
| SiPC1 content in polymer composition | % | 12.5 | 12.5 | 12.5 | 12.5 | 12.5 | 12.5 | 12.5 | 12.5 |
| Property | | | | | | | | | |
| DS-4 | — | 197 | 151 | 221 | 193 | 216 | 213 | 188 | 212 |
| Tensile modulus | MPa | 8867 | 7948 | 8711 | 8882 | 5031 | 4846 | 5036 | 5060 |
| Tensile strength | MPa | 118 | 60 | 115 | 120 | 87 | 47 | 88 | 93 |
| IZOD notched impact at room temp. | kJ/m² | 15 | 14 | 14 | 10 | 12 | 21 | 12 | 10 |

Examples show that similar results are achieved in smoke density properties at 15% glass fiber loading and at 30% glass fiber loading, independent of the glass fiber type. Differences between samples are small and most likely due to experimental variation, rather than significant differences between glass fiber types. At 15% GF loading, Ds-4 values between 180-220 for Examples 51-54 (measured according to ISO 5659-2 at 50 kW/m² on a 3 mm thick plaque) are achieved, which meets HL2 requirements on smoke density for R1 or R6 applications (Ds-4<300 at 50 kW/m²). At 30% GF loading, Ds-4 values between 150-220 for Examples 47-49 (measured according to ISO 5659-2 at 50 kW/m² on a 3 mm thick plaque) are achieved, which meets HL2 requirements on smoke density for R1 or R6 applications (Ds-4<300 at 50 kW/m²). Overall, smoke densities values DS-4<300 are achieved in all cases, showing that the effects discussed above for SiPC1 loading and GF2 loading are translatable to other types of glass fibers as well.

The main effect of the glass fiber type can be found on the mechanical properties. Bonding glass (GF1, GF3, and GF4) outperforms non-bonding glass (GF2), especially with respect to tensile strength, while modulus is also higher, without a significant drop in impact. As such, bonding glass types are preferred to achieve the right combination of low smoke density and good mechanical properties.

Examples 55-62

These examples serve to demonstrate the effect of polycarbonate type on the mechanical properties of compositions containing linear BPA PC (PC1 or PC2), polydimethylsiloxane/bisphenol A polycarbonate copolymer (SiPC1) and 15% and 30% bonding glass fiber (GF1). Formulations and results are shown in Table 12.

TABLE 12

| Component | Unit | Ex55 | Ex56 | Ex57 | Ex58 | Ex59 | Ex60 | Ex61 | Ex62 |
|---|---|---|---|---|---|---|---|---|---|
| PC1 | Wt. % | 61.18 | 0 | 52.44 | 0 | 74.31 | 0 | 63.72 | 0 |
| PC2 | Wt. % | 0 | 61.18 | 0 | 52.42 | 0 | 74.31 | 0 | 63.72 |
| SiPC1 | Wt. % | 8.74 | 8.74 | 17.48 | 17.5 | 10.61 | 10.61 | 21.2 | 21.2 |
| IRGAFOS 168 | Wt. % | 0.08 | 0.08 | 0.08 | 0.08 | 0.08 | 0.08 | 0.08 | 0.08 |
| GF1 | Wt. % | 30 | 30 | 30 | 30 | 15 | 15 | 15 | 15 |
| SiPC1 content in polymer composition | % | 12.5 | 12.5 | 25 | 25 | 12.5 | 12.5 | 25 | 25 |
| Property | | | | | | | | | |
| Tensile modulus | MPa | 8573 | 8778 | 8504 | 8605 | 4728 | 4836 | 4675 | 4863 |
| Tensile strength | MPa | 128 | 135 | 127 | 132 | 90 | 96 | 89 | 95 |
| 1NI at room temp., 4 mm | kJ/m2 | 19 | 16 | 19 | 18 | 14 | 8 | 17 | 12 |
| Flex modulus | MPa | 7838 | 8022 | 7796 | 8160 | 4537 | 4556 | 4374 | 4591 |
| Flex strength | MPa | 191 | 196 | 190 | 193 | 145 | 150 | 142 | 150 |
| MVR, 300, 1.2 kg | cc/10' | 3.8 | 9.0 | 4.0 | 8.3 | 4.7 | 12.3 | 4.6 | 11.4 |

Comparing compositions containing either PC1 or PC2 but otherwise having the same components in same amounts shows the following: compositions containing PC1 or PC2 have similar modulus and strength; the composition containing PC2 has much higher MVR, due to the lower molecular weight (21,800 g/mol) compared to PC1 (30,000 g/mol), measured at 300° C./1.2 Kg at 360 second dwell according to ISO 1133, than the composition containing PC1, which is beneficial for injection molding; and there is a slight drop in impact properties for the composition containing PC2, but the drop is limited. In summary, the flow of the compositions can be tuned by using different types of polycarbonate without significantly affect other properties, including modulus, strength, and smoke density.

Examples 63-66

These examples demonstrate the effect of polydimethylsiloxane/bisphenol A polycarbonate copolymer (SiPC1) addition to compositions containing glass fibers and linear bisphenol A polycarbonate (PC1) on both smoke density and heat release. In all these examples, non-bonding glass for polycarbonate (GF2) was used. Formulations and results are shown in Table 12.

TABLE 12

| | Unit | CEx63 | Ex64 | Ex65 | Ex66 |
|---|---|---|---|---|---|
| Component | | | | | |
| PC1 | Wt. % | 67.82 | 59.34 | 50.87 | 82.74 |
| SiPC1 | Wt. % | | 8.48 | 16.96 | 10.35 |
| IRGAFOS 168 | Wt. % | 0.08 | 0.08 | 0.08 | 0.08 |
| GF2 | Wt. % | 30.00 | 30.00 | 30.00 | 15.00 |
| TiO$_2$ | Wt. % | 2.00 | 2.00 | 2.00 | 2.00 |
| CB | Wt. % | 0.1 | 0.1 | 0.1 | 0.10 |
| SiPC1 content in polymer composition | % | 0 | 12.5 | 25.0 | 12.50 |
| Property | | | | | |
| DS-4 | — | 410 | 93 | 99 | 129 |
| MAHRE | kW/m$^2$ | 82 | 29 | 35 | 53 |

As shown before, a 30% GF2 composition in PC1 has a too high smoke density (410, CEx63) to meet HL2 requirements on smoke density for R1 or R6 applications (Ds-4<300 at 50 kW/m$^2$). Addition of SiPC1 lowers smoke density to Ds-4 values below 100 (Ex64 and Ex65), which meets HL3 requirements on smoke density for R1 or R6 applications (Ds-4<150 at 50 kW/m$^2$). Furthermore, heat release values below 40 kW/m$^2$ are achieved, which meets the requirement for R1 or R6 applications for HL2 (MAHRE<90 kW/m$^2$ at 50 kW/m$^2$) or HL3 (MAHRE<60 kW/m$^2$ at 50 kW/m$^2$). This is a significant reduction compared to the composition without SiPC1 (CEx63, MAHRE of 82 kW/m$^2$ at 50 kW/m$^2$). Also at 15% GF2 loading in compositions containing PC1 and SiPC1 (Ex66), Ds-4 (129) and MAHRE (53 kW/m$^2$) values are below the requirements for HL2 or HL3 for R1 and R6 applications. Accordingly, compositions containing linear bisphenol A polycarbonate, polydimethylsiloxane/bisphenol A polycarbonate copolymer and glass fiber meet the requirements on smoke density and heat release for R6 applications, and as such would be highly suitable for the manufacture of articles for use in these applications. Furthermore, provided the requirements for ISO 5658 flame spread (CFE>20 kW/m$^2$) are met, these compositions are also suitable for R1 applications.

Examples 67-73

These examples demonstrate that the effect of polydimethylsiloxane/bisphenol A polycarbonate copolymer (SiPC1) addition on smoke density is also translatable to compositions containing glass fiber (GF2) and polycarbonate copolymers, such as poly(phthalate-carbonate) copolymer (PC-Ester1). Formulations and results are shown in Tables 13 and 14.

TABLE 13

| Component | Unit | CEx67 | Ex68 | Ex69 | CEx70 | Ex71 | Ex72 |
|---|---|---|---|---|---|---|---|
| PC-Ester | Wt. % | 69.92 | 61.17 | 52.44 | 84.92 | 74.3 | 63.69 |
| SiPC1 | Wt. % | | 8.75 | 17.48 | | 10.62 | 21.23 |
| IRGAFOS 168 | Wt. % | 0.08 | 0.08 | 0.08 | 0.08 | 0.08 | 0.08 |
| GF2 | Wt. % | 30 | 30 | 30 | 15 | 15 | 15 |
| SiPC1 content in polymer composition | % | 0.00 | 12.51 | 25.00 | 0.00 | 12.51 | 25.00 |
| Property | | | | | | | |
| DS4 AVG | — | 293 | 59 | 94 | 140 | 108 | 108 |

Comparative example 67 shows that compositions containing only GF2 and poly(phthalate-carbonate) copolymer (PC-Ester1) has a smoke density very close to the 300 threshold and as such is less suitable to meet the HL2 requirements for R1 or R6 applications (Ds-4<300 at 50 kW/m$^2$), all measured according to ISO 5659-2 at 50 kW/m$^2$ on a 3 mm thick plaque. However, upon the addition of SiPC1, again significant reductions in DS-4 below 300 are achieved resulting in Ds-4 values between 50-100 for 30% GF2 loadings and around 110 for 15% GF2 loadings. For glass-filled compositions containing SiPC1 and PC-Ester1, DS-4 values are significantly below the HL3 requirement (Ds-4<150 at 50 kW/m$^2$) for R1 or R6 applications.

Example 73 shows that for compositions containing PC-Ester and SiPC1 with 30% GF2, HL3 requirements for both Ds-4 (Ds-4<150 at 50 kW/m$^2$) and MAHRE (MAHRE<60 kW/m$^2$ at 50 kW/m$^2$) can be met.

TABLE 14

| | Unit | Ex73 |
|---|---|---|
| Component | | |
| PC-Ester | Wt. % | 59.3 |
| SiPC1 | Wt. % | 8.48 |
| IRGAFOS 168 | Wt. % | 0.08 |
| GF2 | Wt. % | 30 |
| TiO$_2$ | Wt. % | 2 |
| CB | Wt. % | 0.1 |
| SiPC1 content in polymer composition | % | 12.50 |
| Property | | |
| DS4 AVG | | 77 |
| MAHRE | kW/m$^2$ | 25 |

Examples 74-77

These examples show the effect of the addition of BPADP to a composition containing polycarbonate (PC1) or poly(phthalate-carbonate) copolymer (PC-Ester1), polydimethylsiloxane/bisphenol A polycarbonate copolymer (SiPC1) and glass fiber (GF2). Formulations and results are shown in Table 16.

TABLE 16

| | Unit | Ex74 | Ex75 | Ex76 | Ex77 |
|---|---|---|---|---|---|
| Component | | | | | |
| PC1 | Wt. % | 52.75 | 32.46 | 50.59 | |
| PC-Ester | Wt. % | | | | 54.97 |
| SiPC1 | Wt. % | 12.17 | 32.46 | 7.23 | 7.85 |
| IRGAFOS 168 | Wt. % | 0.08 | 0.08 | 0.08 | 0.08 |
| GF2 | Wt. % | 30 | 30 | 30 | 30 |
| TiO$_2$ | Wt. % | | | 2 | 2 |

TABLE 16-continued

| | Unit | Ex74 | Ex75 | Ex76 | Ex77 |
|---|---|---|---|---|---|
| CB | Wt. % | | | 0.1 | 0.1 |
| BPADP | Wt. % | 5 | 5 | 10 | 5 |
| SiPC1 content in polymer composition | % | 18.7 | 50 | 12.5 | 12.50 |
| Property | | | | | |
| Smoke density, DS-4 | — | 100 | 149 | 225 | 103 |
| MAHRE | kW/m$^2$ | NA | NA | 79 | 62 |

These examples show that BPADP can be added to these compositions to improve, for example, flow properties, and that even in the presence of BPADP, still all requirements for EN45545 HL2 can be met, as compositions containing 5% of BPADP have Ds-4 values between 100 and 150 (Ex74, Ex75, Ex77), meeting the HL3 requirement (Ds-4<150 at 50 kW/m$^2$) for R1 or R6 applications and compositions containing 10% of BPADP have Ds-4 values below 300 (Ex76), meeting the HL2 requirement (Ds-4<150 at 50 kW/m$^2$) for R1 or R6 applications Furthermore, heat release properties for Ex76 and Ex77 are sufficient to meet the HL2 requirements for R1 or R6 applications (MAHRE<90 kW/m$^2$ at 50 kW/m$^2$).

Examples 78-72

These examples show the smoke density of compositions containing polydimethylsiloxane/bisphenol A polycarbonate copolymer SiPC1, 30% glass fiber (GF1) and different types of high flow polycarbonate resins, including PC2, PC5, and HFD copolymer. Formulations and results are shown in Table 17.

TABLE 17

| Component | Unit | Ex78 | Ex79 | Ex80 | Ex81 |
|---|---|---|---|---|---|
| Carbon black | Wt. % | 0.1 | 0.1 | 0.1 | 0.1 |
| IRGAFOS 168 | Wt. % | 0.08 | 0.08 | 0.08 | 0.08 |
| TiO$_2$ | Wt. % | 2 | 2 | 2 | 2 |
| PC1 | | | 59.4 | | |
| PC2 | Wt. % | 59.4 | | | |
| PC5 | Wt. % | | | | 59.4 |
| HFD | Wt. % | | | 59.4 | |
| SiPC1 | Wt. % | 8.47 | 8.47 | 8.47 | 8.47 |
| GF1 | Wt. % | 30 | 30 | 30 | 30 |
| Smoke density, Ds-4 | — | 125 | 93 | 135 | 111 |
| MVR, 300, 1.2 kg | cc/10' | 12 | 3 | 15 | 18 |

Examples 78, 80, and 81 show that PC1 can be replaced with lower molecular weight PC (PC2 or PC5) or PC copolymer with improved flow characteristics (HFD) without affecting the smoke density properties significantly. Examples 78, 80 and 81 have somewhat higher Ds-4 values (125, 135 and 111) than low flow PC (PC1, Ex79) (93), but still meet HL2 or HL3 requirements on smoke density for R1 or R6 applications (HL2 requirement of Ds-4<300 at 50 kW/m², HL3 requirement of Ds-4<150 at 50 kW/m².).

Examples 78, 80 and 81 all have significantly higher MVR measured at 300° C./1.2 Kg at 360 second dwell according to ISO 1133, than the composition containing PC1 (Ex 79), which is beneficial for injection molding, without significantly affect smoke density.

Examples 82-89

These examples show the effect of TiO₂ loading on smoke density in compositions containing polydimethylsiloxane/bisphenol A polycarbonate copolymer (SiPC1), 30% glass fiber (GF1) and polycarbonate (PC2). Results and formulations are shown in Table 18.

TABLE 18

| Component | Unit | Ex82 | Ex83 | Ex84 | Ex85 | Ex86 | Ex87 | Ex88 | Ex89 |
|---|---|---|---|---|---|---|---|---|---|
| Carbon black | Wt. % |  | 0.1 | 0.1 | 0.1 | 0.1 | 0.1 | 0.1 | 0.1 |
| IRGAFOS 168 | Wt. % | 0.08 | 0.08 | 0.08 | 0.08 | 0.08 | 0.1 | 0.08 | 0.08 |
| TiO₂ | Wt. % |  | 0.2 | 0.5 | 1 | 2 | 5 | 7.5 | 10 |
| PC2 | Wt. % | 61.2 | 60.92 | 60.65 | 60.22 | 59.3 | 57 | 54.5 | 52.3 |
| SiPC1 | Wt. % | 8.74 | 8.7 | 8.67 | 8.6 | 8.49 | 8.1 | 7.8 | 7.49 |
| GF1 | Wt. % | 30 | 30 | 30 | 30 | 30 | 30 | 30 | 30 |
| Smoke density, Ds-4 | — | 194 | 151 | 119 | 95 | 115 | 99 | 110 | 112 |

The composition without TiO₂ (Ex82) has a smoke density of 194, which is sufficient to meet HL2 requirements on smoke density for R1 or R6 applications (Ds-4<300 at 50 kW/m²). Upon addition of TiO₂, smoke density values decrease to a Ds-4 of 151 at 0.2 wt % TiO₂ (Ex83) and around 90-110 for 0.5 wt % TiO₂ and higher (Ex84-89). Addition of sufficient amounts of TiO₂ can therefore help to further reduce the smoke density compared to compositions containing GF1, PC2 and SiPC1 without TiO₂ to meet HL3 requirements on smoke density for R1 or R6 applications (Ds-4<150 at 50 kW/m²) for compositions containing TiO₂. As such, compositions containing TiO₂ are capable of meeting HL3 requirements for R1 or R6 applications (provided the other requirements are met as well).

Examples 90-109

These examples show the mechanical properties of compositions containing polycarbonate or polycarbonate copolymer (PC1, PC2, PC5, and HFD), 10 to 50% of glass fiber (GF1) and polydimethylsiloxane/bisphenol A polycarbonate copolymer (SiPC1) on the mechanical properties. Results and formulations are shown in Tables 19A and 19B.

TABLE 19A

| COMPONENT | Unit | Ex90 | Ex91 | Ex92 | Ex93 | Ex94 | Ex95 | Ex96 | Ex97 | Ex98 | Ex99 |
|---|---|---|---|---|---|---|---|---|---|---|---|
| PC1 | % | 76.84 |  |  |  | 68.09 |  |  |  | 59.34 |  |
| PC2 | % |  | 76.84 |  |  |  | 68.09 |  |  |  | 59.34 |
| PC5 | % |  |  | 76.84 |  |  |  | 68.09 |  |  |  |
| HIED | % |  |  |  | 76.84 |  |  |  | 68.09 |  |  |
| SiPC1 | % | 10.98 | 10.98 | 10.98 | 10.98 | 9.73 | 9.73 | 9.73 | 9.73 | 8.48 | 8.48 |
| IRGAFOS 168 | % | 0.08 | 0.08 | 0.08 | 0.08 | 0.08 | 0.08 | 0.08 | 0.08 | 0.08 | 0.08 |
| Carbon black | % | 0.10 | 0.10 | 0.10 | 0.10 | 0.10 | 0.10 | 0.10 | 0.10 | 0.10 | 0.10 |
| TiO2 | % | 2.00 | 2.00 | 2.00 | 2.00 | 2.00 | 2.00 | 2.00 | 2.00 | 2.00 | 2.00 |
| GF 1 | % | 10.00 | 10.00 | 10.00 | 10.00 | 20.00 | 20.00 | 20.00 | 20.00 | 30.00 | 30.00 |
| PROPERTY |  |  |  |  |  |  |  |  |  |  |  |
| IZOD Notched Impact 3 mm + 23° C. | kJ/m² | 10 | 7 | 5 | 6 | 10 | 7 | 6 | 7 | 9 | 9 |
| IZOD Un-notched Impact 3 mm + 23° C. | kJ/m² | 72 | 54 | 46 | 46 | 36 | 35 | 31 | 34 | 30 | 33 |
| Tensile modulus | MPa | 3420 | 3580 | 3830 | 3670 | 5340 | 5770 | 6020 | 5970 | 7590 | 8060 |
| Tensile strength | MPa | 51 | 58 | 65 | 62 | 76 | 80 | 85 | 84 | 88 | 94 |
| Elongation at break | % | 6.2 | 4.9 | 4.4 | 4.3 | 3.1 | 2.8 | 2.5 | 2.6 | 2.2 | 2.2 |
| Flexural modulus | MPa | 3260 | 3490 | 3730 | 3460 | 5010 | 5400 | 5630 | 5430 | 7000 | 7360 |
| Flexural strength | MPa | 112 | 116 | 123 | 114 | 129 | 131 | 136 | 129 | 129 | 137 |
| Density | g/cm³ | 1.27 | 1.26 | 1.26 | 1.26 | 1.35 | 1.34 | 1.34 | 1.34 | 1.43 | 1.43 |
| MVR, 300° C., 1.2 kg | Cc/10 min | 4.2 | 11.3 | 24.8 | 19.7 | 3.7 | 8.8 | 18.1 | 14.3 | 3.8 | 7.7 |

TABLE 19B

| COMPONENT | Unit | Ex100 | Ex101 | Ex102 | Ex103 | Ex104 | Ex105 | Ex106 | Ex107 | Ex108 | Ex109 |
|---|---|---|---|---|---|---|---|---|---|---|---|
| PC1 | % | | | 50.59 | | | | 41.84 | | | |
| PC2 | % | | | | 50.59 | | | | 41.84 | | |
| PC5 | % | 59.34 | | | | 50.59 | | | | 41.84 | |
| HFED | % | | 59.34 | | | | 50.59 | | | | 41.84 |
| SiPC1 | % | 8.48 | 8.48 | 7.23 | 7.23 | 7.23 | 7.23 | 5.98 | 5.98 | 5.98 | 5.98 |
| IRGAFOS 168 | % | 0.08 | 0.08 | 0.08 | 0.08 | 0.08 | 0.08 | 0.08 | 0.08 | 0.08 | 0.08 |
| Carbon black | % | 0.10 | 0.10 | 0.10 | 0.10 | 0.10 | 0.10 | 0.10 | 0.10 | 0.10 | 0.10 |
| TiO2 | % | 2.00 | 2.00 | 2.00 | 2.00 | 2.00 | 2.00 | 2.00 | 2.00 | 2.00 | 2.00 |
| GF 1 | % | 30.00 | 30.00 | 40.00 | 40.00 | 40.00 | 40.00 | 50.00 | 50.00 | 50.00 | 50.00 |
| PROPERTY | | | | | | | | | | | |
| IZOD Notched Impact 3 mm + 23° C. | kJ/m$^2$ | 7 | 8 | 9 | 9 | 8 | 9 | 8 | 8 | 8 | 9 |
| IZOD Un-notched Impact 3 mm + 23° C. | kJ/m$^2$ | 31 | 32 | 28 | 31 | 28 | 31 | 25 | 27 | 26 | 26 |
| Tensile modulus | MPa | 8420 | 8200 | 9960 | 10480 | 11000 | 10990 | 12790 | 13260 | 14150 | 13810 |
| Tensile strength | MPa | 100 | 97 | 93 | 102 | 105 | 107 | 103 | 107 | 113 | 113 |
| Elongation at break | % | 2.1 | 2.1 | 1.8 | 2.0 | 1.8 | 1.9 | 1.7 | 1.7 | 1.7 | 1.7 |
| Flexural modulus | MPa | 7630 | 7280 | 8990 | 9060 | 9590 | 9490 | 11110 | 11290 | 12420 | 11870 |
| Flexural strength | MPa | 142 | 137 | 139 | 145 | 151 | 151 | 148 | 154 | 164 | 157 |
| Density | g/cm$^3$ | 1.42 | 1.41 | 1.54 | 1.53 | 1.52 | 1.52 | 1.64 | 1.64 | 1.65 | 1.63 |
| MVR, 300° C., 1.2 kg | Cc/10 min | 14.3 | 11.8 | 4.2 | 7.9 | 12.5 | 10.6 | 3.9 | 8.1 | 10.3 | 8.8 |

Examples 90-109 show that the mechanical properties, such as modulus and strength, depend mainly on the GF1 content, and to a lesser extent on the polycarbonate type (PC1, PC2, PC5, or HFD). Therefore, the glass fiber loading can be adjusted to achieve a certain modulus or strength, as desired from the actual application.

At GF1 contents between 10 to 20 wt. %, based on the total weight of the composition; the composition has a tensile modulus of equal to or higher than 3400 MPa, measured according to ISO 527 at 5 mm/min and at 23° C., a tensile strength of equal to or higher than 50 MPa measured according to ISO 527 at 5 mm/min and at 23° C., an IZOD notched impact of equal to or higher than 5 kJ/m$^2$ measured according to ISO 180 at 5.5 J and at 23° C. on a 3 mm thick sample and a density of equal to or lower than 1.36 g/cm$^3$ measured according to ISO 1183.

At GF1 contents between 20 to 30 wt. %, based on the total weight of the composition; the composition has a tensile modulus of equal to or higher than 5000 MPa, measured according to ISO 527 at 5 mm/min and at 23° C., a tensile strength of equal to or higher than 70 MPa measured according to ISO 527 at 5 mm/min and at 23° C., an IZOD notched impact of equal to or higher than 5 kJ/m$^2$ measured according to ISO 180 at 5.5 J and at 23° C. on a 3 mm thick sample, and a density of equal to or lower than 1.45 g/cm$^3$ measured according to ISO 1183.

At GF1 contents between 30 to 40 wt. %, based on the total weight of the composition; the composition has a tensile modulus of equal to or higher than 7500 MPa, measured according to ISO 527 at 5 mm/min and at 23° C., a tensile strength of equal to or higher than 85 MPa measured according to ISO 527 at 5 mm/min and at 23° C., an IZOD notched impact of equal to or higher than 6 kJ/m$^2$ measured according to ISO 180 at 5.5 J and at 23° C. on a 3 mm thick sample and a density of equal to or lower than 1.55 g/cm$^3$ measured according to ISO 1183.

At GF1 contents between 40 to 50 wt. %, based on the total weight of the composition; the composition has a tensile modulus of equal to or higher than 9500 MPa, measured according to ISO 527 at 5 mm/min and at 23° C., a tensile strength of equal to or higher than 90 MPa measured according to ISO 527 at 5 mm/min and at 23° C., an IZOD notched impact of equal to or higher than 7 kJ/m$^2$ measured according to ISO 180 at 5.5 J and at 23° C. on a 3 mm thick sample and a density of equal to or lower than 1.66 g/cm3 measured according to ISO 1183.

Examples 110-126

These examples show the smoke density measured according to ASTM E662 for compositions containing polycarbonate or polycarbonate copolymer (PC1, PC2, PC5, or HFD), glass fiber (GF1 or GF2) and different types of aliphatic siloxane (SiPC1, SiPC2, PDMS, PPMS, or MR01). Results and formulations are shown in Tables 20A and 20B.

TABLE 20A

| Component | Unit | CEx110 | Ex111 | Ex112 | Ex113 | Ex114 | Ex115 | Ex116 | Ex117 | Ex118 |
|---|---|---|---|---|---|---|---|---|---|---|
| PC1 | Wt % | 69.92 | 65.54 | 61.18 | 34.92 | 78.68 | 52.43 | 67.3 | 69.438 | |
| PC2 | Wt % | | | | | | | | | 61.18 |
| PC5 | Wt % | | | | | | | | | |
| Irgafos 168 | Wt % | 0.08 | 0.08 | 0.08 | 0.08 | 0.08 | 0.08 | 0.08 | 0.08 | 0.08 |
| SiPC1 | Wt % | | 4.38 | 8.74 | 35 | 11.24 | 7.49 | | | 8.74 |
| SiPC2 | Wt % | | | | | | | 2.62 | | |
| PDMS | Wt % | | | | | | | | 0.482 | |
| PPMS | Wt % | | | | | | | | | |
| MR01 | Wt % | | | | | | | | | |
| TiO2 | Wt % | | | | | | | | | 0 |
| CB | Wt % | | | | | | | | | 0 |
| GF2 | Wt % | 30 | 30 | 30 | 30 | 10 | 40 | 30 | 30 | |
| GF1 | Wt % | | | | | | | | | 30 |

TABLE 20A-continued

| Component | Unit | CEx110 | Ex111 | Ex112 | Ex113 | Ex114 | Ex115 | Ex116 | Ex117 | Ex118 |
|---|---|---|---|---|---|---|---|---|---|---|
| PC/SiPC1 ratio | % | 0 | 6.25 | 12.5 | 50 | 12.5 | 12.5 | | | 12.5 |
| ASTM E662 Smoke density DS-1.5 | — | 19 | 4 | 10 | 3 | 9 | 3 | 5 | 4 | 6 |
| ASTM E662 Smoke density DS-4 | — | 203 | 45 | 93 | 121 | 91 | 53 | 42 | 82 | 80 |

TABLE 20B

| Component | Unit | Ex119 | Ex120 | Ex121 | Ex122 | Ex123 | CEx124 | Ex125 | EX126 |
|---|---|---|---|---|---|---|---|---|---|
| PC1 | Wt % | | | 59.35 | | | 69.04 | | |
| PC2 | Wt % | 60.65 | 59.35 | | 59.35 | | | 84.12 | 69.26 |
| PC5 | Wt % | | | | | 59.35 | | | |
| Irgafos 168 | Wt % | 0.08 | 0.08 | 0.08 | 0.08 | 0.08 | 0.08 | 0.08 | 0.08 |
| SiPC1 | Wt % | 8.67 | 8.47 | 8.47 | 8.47 | 8.47 | | | |
| SiPC2 | Wt % | | | | | | | | |
| PDMS | Wt % | | | | | | | | |
| PPMS | Wt % | | | | | | 0.88 | | |
| MRO1 | Wt % | | | | | | | 0.80 | 0.66 |
| TiO2 | Wt % | 0.5 | 2 | 2 | 2 | 2 | 2 | | |
| CB | Wt % | 0.1 | 0.1 | 0.1 | 0.1 | 0.1 | 0.1 | | |
| GF2 | Wt % | | | | | | | | |
| GF1 | Wt % | 30 | 30 | 30 | 30 | 30 | 30 | 15 | 30 |
| PC/SiPC1 ratio | % | 12.5 | 12.5 | 12.5 | 12.5 | 12.5 | | | |
| ASTM E662 Smoke density DS-1.5 | — | 10 | 15 | 15 | 12 | 18 | 18 | 9 | 10 |
| ASTM E662 Smoke density DS-4 | — | 83 | 104 | 104 | 108 | 104 | 223 | 95 | 98 |

For all examples, NFPA-130 requirements for Ds-1.5 are met with Ds-1.5 values all below 20 (Ds-1.5<100), measured according to ASTM E662 on 3 mm thick plaques. Comparative example 110 shows that a composition containing 30% GF2 in PC1 has a too high smoke density Ds-4 measured according to ASTM E662 at 3 mm thickness to meet NFPA-130 requirements for smoke density, which requires a Ds-4 below 200, and are as such not suitable for rail interior applications requiring meeting NFPA-130 requirements. Compositions containing 30% GF2 in PC1 and various contents of SiPC1 ranging from 6.3 wt % to 50 wt % based on the total polymer content in the composition (Ex111-113) have significantly lower Ds-4 values significantly below 200. Low smoke density Ds-4 values are also achieved for compositions containing GF2, PC1 and SiPC1 at glass fiber loadings between 10 and 40% (Ex112, Ex111 and Ex115), for compositions containing GF2, PC1 and SiPC1 at different loadings of TiO$_2$ ranging from 0 to 2 wt % (Ex118, Ex119, and Ex120) and for compositions containing SiPC1, 30% GF 1 and different polycarbonate types (Ex121, Ex122, and Ex123). Alternative aliphatic siloxane sources (SiPC2, PDMS, MRO1) also result in low Ds-4 values below 100 (Ex116, Ex117, Ex125, Ex128), whereas aromatic siloxanes result in too high Ds-4 values above 200 (CEx124). This is contradictory to commonly applied flame retardant (FR) approaches in polycarbonate for UL performance, where typically aromatic siloxanes, such as polymethylphenylsiloxane or octaphenylcyclotretrasiloxane are used, but not aliphatic ones. As such, compositions containing glass fiber, polycarbonate, for example, a polycarbonate copolymer, or a combination thereof, and an aliphatic polysiloxane source are suitable for rail interior applications requiring meeting NFPA-130, provided all other requirements are met.

Examples 127-131

These examples show the effect of adding a silicone graft copolymer (MR01) on the smoke density of compositions comprising linear bisphenol A polycarbonate (PC1) and 30% glass fiber (GF1). Formulations and results are shown in Table 21.

TABLE 21

| Component | Unit | CEx127 | CEx128 | Ex129 | Ex130 | Ex131 |
|---|---|---|---|---|---|---|
| PC2 | Wt. % | 84.92 | 69.92 | 84.12 | 69.26 | 68.61 |
| MRO1 | Wt. % | | | 0.80 | 0.66 | 1.31 |
| Irgafos 168 | Wt. % | 0.08 | 0.08 | 0.08 | 0.08 | 0.08 |
| GF2 | Wt. % | 15 | 30 | 15 | 30 | 30 |
| Siloxane content in the polymer composition | | | | 0.75 | 0.75 | 0.75 |
| Property | | | | | | |
| DS-4 | — | 543 | 507 | 207 | 146 | 191 |
| MAHRE | kW/m$^2$ | 108 | 105 | 79 | 84 | 83 |

Comparative examples 127 (15% GF1) and 128 (30% GF1) shows that compositions containing GF1 in PC2 have a too high smoke density (Ds-4 above measured according to ISO 5659-2 at 50 kW/m² on a 3 mm thick plaque) to be suitable for EN45545 R1 or R6 applications (requirement for HL2 compliance for R1 or R6 applications is DS-4<300 at 50 kW/m²). Furthermore, the heat release (MAHRE) values of above 100 kW/m², measured according to ISO 5660-1 at 50 kW/m² on 3 mm thick plaques, are too high to meet the requirement for R1 or R6 applications for HL2 (MAHRE<90 kW/m² at 50 kW/m²). Upon the addition of small amounts of MR01 (Examples 129, 130 and 131), significant reductions in DS-4 below 300 are achieved with Ds-4 values between 140 and 210 measured according to ISO 5659-2 at 50 kW/m² on a 3 mm thick plaque, allowing meeting smoke density requirements for R1 or R6 applications (DS-4<300 at 50 kW/m²). Furthermore, the heat release (MAHRE) values decrease to values between 70 and 90 kW/m², measured according to ISO 5660-1 at 50 kW/m² on 3 mm thick plaques, which is sufficient to meet the requirement for R1 or R6 applications for HL2 (MAHRE<90 kW/m² at 50 kW/m²). As such, the smoke density and heat release reducing effects described above for polydimethylsiloxane/bisphenol A polycarbonate copolymer (SiPC1) in compositions containing PC and GF are also translatable to silicone graft copolymers.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Unless otherwise indicated, exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A railway component,
    wherein the component is a molded or extruded interior train component comprising a polycarbonate composition comprising:
    a first polycarbonate selected from a linear polycarbonate homopolymer, a branched polycarbonate, a poly(carbonate-bisphenol arylate ester), a poly(aliphatic ester-carbonate), or a combination comprising at least one of the foregoing;
    a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the polycarbonate composition in an amount of 0.3 to 3 wt. %, based on the total weight of the polycarbonate composition; and
    10 to 50 wt. % of glass fiber, based on the total weight of the polycarbonate composition;
    wherein a sample of the polycarbonate composition has:
    a smoke density after 4 minutes (DS-4) of less than or equal to 300 determined according to ISO 5659-2 on a 3 mm thick plaque at 50 kW/m², and a maximum average heat release (MAHRE) of equal to or less than 90 kW/m² measured according to ISO 5660-1 on a 3 mm thick plaque at 50 kW/m², wherein the component is free of a polyetherimide.

2. The railway component of claim 1, wherein a sample of the polycarbonate composition has:

a smoke density after 4 minutes (DS-4) of less than or equal to 150 determined according to ISO 5659-2 on a 3 mm thick plaque at 50 kW/m², and a maximum average heat release (MAHRE) of equal to or less than 60 kW/m² measured according to ISO 5660-1 on a 3 mm thick plaque at 50 kW/m².

3. The railway component of claim 1, wherein the first polycarbonate comprises linear polycarbonate homopolymer comprising repeating units of the formula

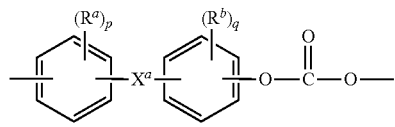

wherein $R^a$ and $R^b$ are each independently a $C_{1-12}$ alkyl group, $C_{1-12}$ alkenyl, $C_{3-8}$ cycloalkyl, or $C_{1-12}$ alkoxy, p and q are each independently integers of 0 to 4, and $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group.

4. The railway component of claim 1, wherein the linear polycarbonate homopolymer comprises bisphenol A carbonate units.

5. The railway component of claim 1, wherein the linear polycarbonate has an average molecular weight of 18,000 to 25,000 g/mol; and wherein the composition has a melt volume flow rate of about 8 to about 25 cc/10 min, measured at 300° C./1.2 Kg at 360 second dwell according to ISO 1133.

6. The railway component of claim 1, wherein the first polycarbonate comprises a branched polycarbonate comprising repeating carbonate units of the formula:

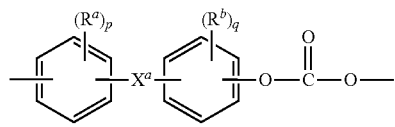
(1)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group, and greater than or equal to 0.2 mole %, based on the total moles of the branched polycarbonate, of moieties derived from a branching agent.

7. The railway component of claim 6, wherein the branching agent comprises trimellitic trichloride, 1,1,1-tris(4-hydroxyphenyl)ethane or a combination of trimellitic trichloride and 1,1,1-tris(4-hydroxyphenyl)ethane.

8. The railway component of claim 6, wherein the branched polycarbonate comprises end-capping groups derived from an end-capping agent selected from phenol, p-t-butylphenol, p-methoxyphenol, p-cyanophenol, p-cumylphenol, or a combination comprising at least one of the foregoing.

9. The railway component of claim 1, wherein the first polycarbonate comprises a poly(carbonate-bisphenol arylate ester) comprising bisphenol A carbonate units as the first repeating units and arylate ester units as the second repeating units, wherein the second repeating units are of the formula

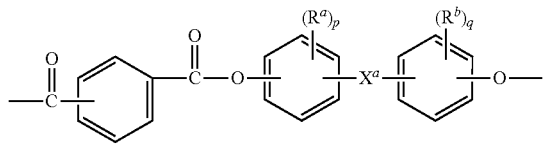

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group.

10. The railway component of claim 9, wherein $R^a$ and $R^b$ are each independently a $C_{1-3}$ alkyl, p and q are each independently 0 or 1, $X^a$ is alkylidene of formula —C($R^c$)($R^d$)— wherein $R^c$ and $R^d$ are each $C_{1-6}$ alkyl, and the ratio of the weight percent of the ester units to the carbonate units in the poly(carbonate-bisphenol arylate ester) is 50:50 to 99:1.

11. The railway component of claim 10, wherein the poly(carbonate-bisphenol arylate ester) is a poly(bisphenol A carbonate)-co-(bisphenol phthalate ester) comprising 55 to 65 wt. % of the ester units, wherein the ester units have a molar ratio of isophthalate to terephthalate of 45:55 to 55:45.

12. The railway component of claim 10, wherein the poly(carbonate-bisphenol arylate ester) is a poly(bisphenol A carbonate)-co-(bisphenol phthalate ester) comprising 75 to 85 wt. % of the ester units, wherein the ester units have a molar ratio of isophthalate to terephthalate of 98:2 to 88:12.

13. The railway component of claim 1, wherein the first polycarbonate comprises a poly(aliphatic ester-carbonate), and the poly(aliphatic ester-carbonate) comprises bisphenol A sebacate ester units and bisphenol A carbonate units in a molar ratio of 2:98 to 8:92.

14. The railway component of claim 1, wherein the second polymer comprises a poly(carbonate-siloxane) copolymer comprising first repeating units and second repeating units, wherein the first repeating units are bisphenol carbonate units of the formula

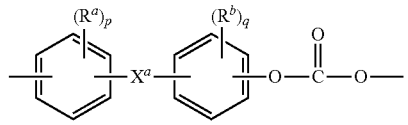

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and the second repeating units are polysiloxane units of the formula

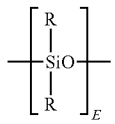

wherein

R is each independently a $C_{1-13}$ monovalent hydrocarbon group, and

E has an average value of 2 to 200.

15. The railway component of claim 14, wherein the second repeating units are siloxane units of the formulas

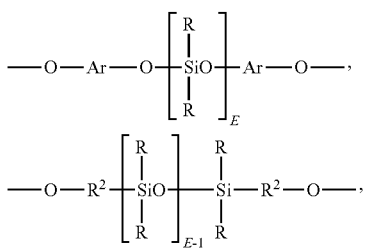

or a combination comprising at least one of the foregoing, wherein

R is each independently a $C_{1-13}$ monovalent hydrocarbon group,

Ar is each independently a $C_{6-30}$ aromatic group, $R^2$ is each independently a $C_{2-8}$ alkylene group, and E has an average value of 2 to 200.

16. The railway component of claim 15, wherein the siloxane units are of the formula

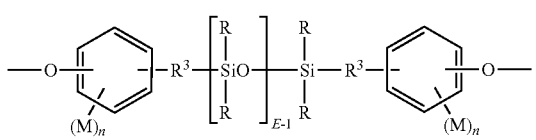

or a combination comprising at least one of the foregoing, wherein E has an average value of 2 to 200.

17. The railway component of claim 1, wherein the siloxane units are of the formula

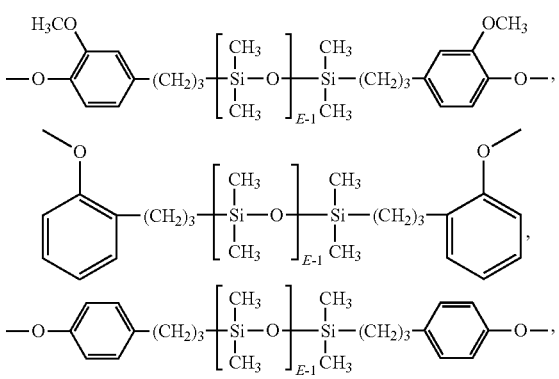

wherein

R is each independently a $C_{1-13}$ monovalent hydrocarbon group, $R^3$ is independently a divalent $C_{2-8}$ aliphatic group, M is each independently a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, or a combination comprising at least one of the foregoing, n is each independently 0, 1, 2, 3, or 4, and E has an average value of 2 to 200.

18. The railway component of claim 15, wherein the siloxane units are siloxane units of the formula

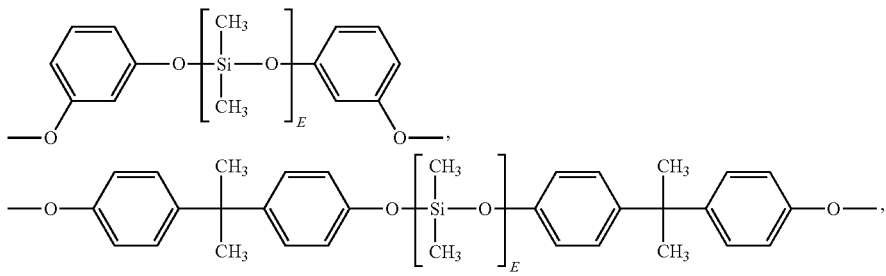

or a combination comprising at least one of the foregoing, wherein E has an average value of 2 to 200.

19. The railway component of claim 18, wherein E has an average value of 5 to 120.

20. The railway component of claim 1, wherein the second polymer is present in an amount effective to provide 0.3 wt. % to 3.0 wt. % siloxane based on the total weight of the polycarbonate composition.

21. The railway component of claim 1, wherein the second polymer comprises polydialkylsiloxane having a viscosity from 10 to 100,000,000 mPa-s at 25° C., and wherein the alkyl groups each independently comprises 1 to 10 carbon atoms.

22. The railway component of claim 21, wherein the polydialkylsiloxane is a polydimethylsiloxane having a viscosity from 50 to 1,000 mPa-s at 25° C.

23. The railway component of claim 1, wherein the second polymer comprises a silicone graft copolymer comprising a core comprising a polydiorganosiloxane and a vinyl-based monomer graft copolymerized with the core to form a shell.

24. The railway component of claim 1, wherein glass fiber has a length of about 1 to about 10 millimeters and a diameter of about 5 to about 20 micrometers.

25. The railway component of claim 1, wherein glass fiber is bonding glass fiber that bounds with a polycarbonate, a polyphenylene ether or a polyamide.

26. The railway component of claim 1, wherein the glass fiber is present in an amount of 10 to 20 wt. %, based on the total weight of the composition; and wherein the component has:
  a tensile modulus of equal to or higher than 3400 MPa, measured according to ISO 527 at 5 mm/min and at 23° C.,
  a tensile strength of equal to or higher than 50 MPa measured according to ISO 527 at 5 mm/min and at 23° C.,
  an IZOD notched impact of equal to or higher than 5 kJ/m² measured according to ISO 180 at 5.5 J and at 23° C. on a 3 mm thick sample, and
  a density of equal to or lower than 1.36 g/cm³ measured according to ISO 1183.

27. The railway component of claim 1, wherein the glass fiber is present in an amount of 20 to 30 wt. %, based on the total weight of the composition; and wherein the component has:
  a tensile modulus of equal to or higher than 5000 MPa, measured according to ISO 527 at 5 mm/min and at 23° C.,
  a tensile strength of equal to or higher than 70 MPa measured according to ISO 527 at 5 mm/min and at 23° C.,
  an IZOD notched impact of equal to or higher than 5 kJ/m² measured according to ISO 180 at 5.5 J and at 23° C. on a 3 mm thick sample, and
  a density of equal to or lower than 1.45 g/cm³ measured according to ISO 1183.

28. The railway component of claim 1, wherein the glass fiber is present in an amount of 30 to 40 wt. %, based on the total weight of the composition; and wherein the component has:
  a tensile modulus of equal to or higher than 7500 MPa, measured according to ISO 527 at 5 mm/min and at 23° C.,
  a tensile strength of equal to or higher than 85 MPa measured according to ISO 527 at 5 mm/min and at 23° C.,
  an IZOD notched impact of equal to or higher than 6 kJ/m² measured according to ISO 180 at 5.5 J and at 23° C. on a 3 mm thick sample, and
  a density of equal to or lower than 1.55 g/cm³ measured according to ISO 1183.

29. The railway component of claim 1, wherein the glass fiber is present in an amount of 40 to 50 wt. %, based on the total weight of the composition; and wherein the component has:
  a tensile modulus of equal to or higher than 9500 MPa, measured according to ISO 527 at 5 mm/min and at 23° C.,
  a tensile strength of equal to or higher than 90 MPa measured according to ISO 527 at 5 mm/min and at 23° C.,
  an IZOD notched impact of equal to or higher than 7 kJ/m2 measured according to ISO 180 at 5.5 J and at 23° C. on a 3 mm thick sample, and
  a density of equal to or lower than 1.66 g/cm3 measured according to ISO 1183.

30. The railway component of claim 1, wherein the polycarbonate composition comprises, based on the weight of the composition,
  25 to 90 wt. % of a linear bisphenol A polycarbonate homopolymer;
  a poly(carbonate-siloxane), present in an amount wherein siloxane units in the second polymer are present in the polycarbonate composition in an amount of 0.3 to 3 wt. %, based on the total weight of the polymer composition; and comprising
  bisphenol A carbonate units, and
  siloxane units of the formula

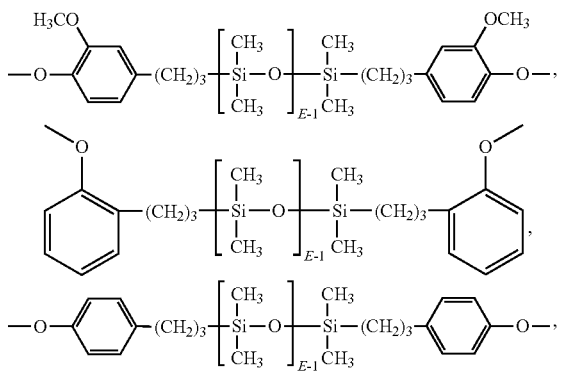

or a combination comprising at least one of the foregoing, wherein E has an average value of 2 to 200;
  wherein the poly(carbonate-siloxane) comprises 0.5 to 55 wt. % of siloxane units based on the total weight of the poly(carbonate-siloxane); and
  10 wt. % to 50 wt. % of glass fiber;
  wherein a sample of the polycarbonate composition has a smoke density after 4 minutes (DS-4) of less than or equal to 300 determined according to ISO 5659-2 on a 3 mm thick plaque at 50 kW/m² and a maximum average heat release (MAHRE) of equal to or less than 90 kW/m² measured according to ISO 5660-1 on a 3 mm thick plaque at 50 kW/m².

31. The railway component of claim 30, wherein a sample of the polycarbonate composition has:
  a smoke density after 4 minutes (DS-4) of less than or equal to 150 determined according to ISO 5659-2 on a 3 mm thick plaque at 50 kW/m², and
  a maximum average heat release (MAHRE) of equal to or less than 60 kW/m² measured according to ISO 5660-1 on a 3 mm thick plaque at 50 kW/m².

32. The railway component of claim 1, wherein the polycarbonate composition comprises, based on the weight of the composition,
  25 to 90 wt. % of a poly(bisphenol A carbonate)-co-(bisphenol phthalate ester) comprising 75 to 85 wt. % of the ester units, wherein the ester units have a molar ratio of isophthalate to terephthalate of 98:2 to 88:12; and
  a poly(carbonate-siloxane), present in an amount wherein siloxane units in the second polymer are present in the polycarbonate composition in an amount of 0.3 to 3 wt. %, based on the total weight of the polymer composition; comprising
  bisphenol A carbonate units, and
  siloxane units of the formula

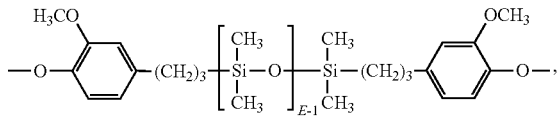

-continued

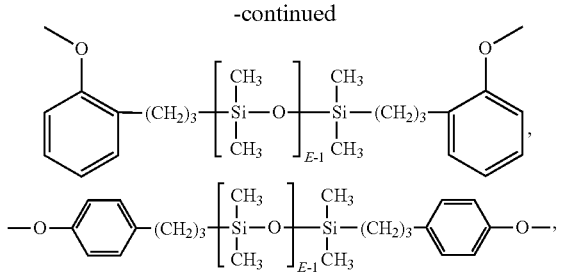

or a combination comprising at least one of the foregoing, wherein E has an average value of 2 to 200;
wherein the poly(carbonate-siloxane) comprises 0.5 to 55 wt. % of siloxane units based on the total weight of the poly(carbonate-siloxane); and
10 wt. % to 50 wt. % of glass fiber;
wherein a sample of the polycarbonate composition has a smoke density after 4 minutes (DS-4) of less than or equal to 300 determined according to ISO 5659-2 on a 3 mm thick plaque at 50 kW/m² and a maximum average heat release (MAHRE) of equal to or less than 90 kW/m² measured according to ISO 5660-1 on a 3 mm thick plaque at 50 kW/m².

33. The railway component of claim 32, wherein a sample of the polycarbonate composition has:
a smoke density after 4 minutes (DS-4) of less than or equal to 150 determined according to ISO 5659-2 on a 3 mm thick plaque at 50 kW/m², and
a maximum average heat release (MAHRE) of equal to or less than 60 kW/m² measured according to ISO 5660-1 on a 3 mm thick plaque at 50 kW/m².

34. The railway component of claim 1, wherein the polycarbonate composition comprises, based on the weight of the composition,
25 to 90 wt. % of a poly(aliphatic ester-carbonate) comprising bisphenol A sebacate ester units and bisphenol A carbonate units in a molar ratio of 2:98 to 8:92; and
a poly(carbonate-siloxane), present in an amount wherein siloxane units in the second polymer are present in the polycarbonate composition in an amount of 0.3 to 3 wt. %, based on the total weight of the polymer composition; comprising
bisphenol A carbonate units, and
siloxane units of the formula

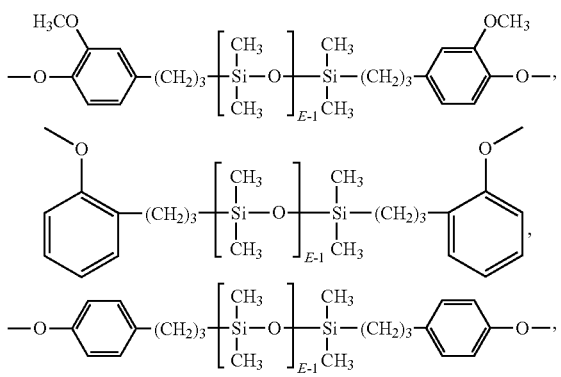

or a combination comprising at least one of the foregoing, wherein E has an average value of 2 to 200;
wherein the poly(carbonate-siloxane) comprises 0.5 to 55 wt. % of siloxane units based on the total weight of the poly(carbonate-siloxane); and
10 wt. % to 50 wt. % of glass fiber;
wherein a sample of the polycarbonate composition has a smoke density after 4 minutes (DS-4) of less than or equal to 300 determined according to ISO 5659-2 on a 3 mm thick plaque at 50 kW/m² and a maximum average heat release (MAHRE) of equal to or less than 90 kW/m² measured according to ISO 5660-1 on a 3 mm thick plaque at 50 kW/m².

35. The railway component of claim 34, wherein a sample of the polycarbonate composition has:
a smoke density after 4 minutes (DS-4) of less than or equal to 150 determined according to ISO 5659-2 on a 3 mm thick plaque at 50 kW/m², and
a maximum average heat release (MAHRE) of equal to or less than 60 kW/m² measured according to ISO 5660-1 on a 3 mm thick plaque at 50 kW/m².

36. The railway component of claim 1, wherein the polycarbonate composition further comprising 0.2 to 10 wt. % of titanium dioxide.

37. The railway component of claim 1, wherein the polycarbonate composition further comprising an aromatic organophosphorus compound having at least one organic aromatic group and at least one phosphorus-containing group, or an organic compound having at least one phosphorus-nitrogen bond.

38. The railway component of claim 37, wherein the organophosphorus compound is bisphenol A bis(diphenyl phosphate), triphenyl phosphate, resorcinol bis(diphenyl phosphate), tricresyl phosphate, a phenol/bi-phenol polyphosphate, or a combination comprising at least one of the foregoing.

39. The railway component of claim 37, wherein organophosphorus compound containing a nitrogen-phosphorus bond is a phosphazene, phosphorus ester amide, phosphoric acid amide, phosphonic acid amide, phosphinic acid amide, tris(aziridinyl)phosphine oxide, a combination comprising at least one of the foregoing.

40. The railway component of claim 37, wherein the organophosphorus compound is effective to provide phosphorus in an amount of 0.1% to 1.0% of phosphorus, based on the weight of the polycarbonate composition.

41. The railway component of claim 1, wherein no or substantially no brominated polycarbonate is present in the polycarbonate composition.

42. The railway component of claim 1, wherein the polycarbonate composition further comprising no more than 5 wt. % based on the weight of the composition of a processing aid, a heat stabilizer, an antioxidant, an ultra violet light absorber, a colorant, or a combination comprising at least one of the foregoing.

43. The railway component of claim 1, wherein the polycarbonate composition comprises, based on the weight of the composition,
32.5 to 90 wt. % of a of a linear bisphenol A polycarbonate homopolymer having a molecular weight of about 17,000 g/mol to about 23,000 g/mol as determined by gel permeation chromatography using polycarbonate standards;
a poly(carbonate-siloxane) present in an amount wherein siloxane units in the second polymer are present in the polycarbonate composition in an amount of 0.3 to 3 wt. %, based on the total weight of the polymer composition; comprising
bisphenol A carbonate units, and siloxane units of the formula

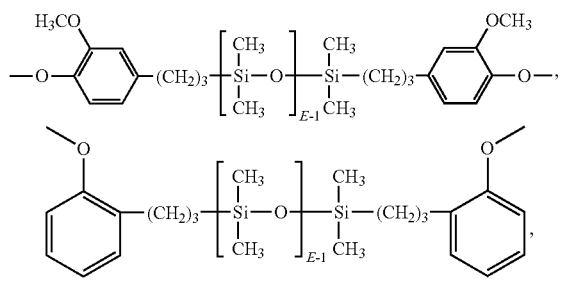

or a combination comprising at least one of the foregoing, wherein E has an average value of 2 to 200;
wherein the poly(carbonate-siloxane) comprises 0.5 to 55 wt. % of siloxane units based on the total weight of the poly(carbonate-siloxane); and
10 to 35 wt. % of glass fiber; and
0 to 5 wt. % of titanium dioxide;
wherein a sample of the polycarbonate composition has a smoke density after 4 minutes (DS-4) of less than or equal to 300 determined according to ISO 5659-2 on a 3 mm thick plaque at 50 kW/m$^2$, and a maximum average heat release (MAHRE) of less than or equal to 90 kW/m$^2$ determined according to ISO 5660-1 on a 3 mm thick plaque at 50 kW/m$^2$.

44. The railway component of claim 43, wherein a sample of the polycarbonate composition has:
a smoke density after 4 minutes (DS-4) of less than or equal to 150 determined according to ISO 5659-2 on a 3 mm thick plaque at 50 kW/m$^2$, and
a maximum average heat release (MAHRE) of equal to or less than 60 kW/m$^2$ measured according to ISO 5660-1 on a 3 mm thick plaque at 50 kW/m$^2$.

45. The railway component of claim 1, wherein the polycarbonate composition comprises, based on the weight of the composition,
32.5 to 90 wt. % of a of a linear bisphenol A polycarbonate homopolymer having a molecular weight of about 25,000 g/mol to about 35,000 g/mol as determined by gel permeation chromatography using polycarbonate standards;
a poly(carbonate-siloxane) present in an amount wherein siloxane units in the second polymer are present in the polycarbonate composition in an amount of 0.3 to 3 wt. %, based on the total weight of the polymer composition; comprising
bisphenol A carbonate units, and
siloxane units of the formula

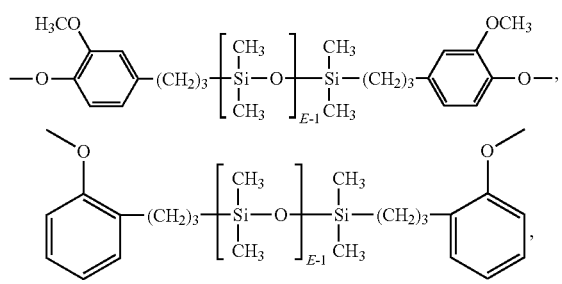

or a combination comprising at least one of the foregoing, wherein E has an average value of 2 to 200;
wherein the poly(carbonate-siloxane) comprises 0.5 to 55 wt. % of siloxane units based on the total weight of the poly(carbonate-siloxane); and
10 to 35 wt. % of glass fiber; and
0.5 to 5 wt. % of titanium dioxide;
wherein a sample of the polycarbonate composition has a smoke density after 4 minutes (DS-4) of less than or equal to 300 determined according to ISO 5659-2 on a 3 mm thick plaque at 50 kW/m$^2$, and a maximum average heat release (MAHRE) of less than or equal to 90 kW/m$^2$ determined according to ISO 5660-1 on a 3 mm thick plaque at 50 kW/m$^2$.

46. The railway component of claim 45, wherein a sample of the polycarbonate composition has:
a smoke density after 4 minutes (DS-4) of less than or equal to 150 determined according to ISO 5659-2 on a 3 mm thick plaque at 50 kW/m$^2$, and
a maximum average heat release (MAHRE) of equal to or less than 60 kW/m$^2$ measured according to ISO 5660-1 on a 3 mm thick plaque at 50 kW/m$^2$.

47. The railway component of claim 1, wherein the polycarbonate composition comprises, based on the weight of the composition,
25 to 90 wt. % of a poly(aliphatic ester-carbonate) comprising bisphenol A sebacate ester units and bisphenol A carbonate units in a molar ratio of 2:98 to 8:92; and
a poly(carbonate-siloxane) present in an amount wherein siloxane units in the second polymer are present in the polycarbonate composition in an amount of 0.3 to 3 wt. %, based on the total weight of the polymer composition; comprising
bisphenol A carbonate units, and
siloxane units of the formula

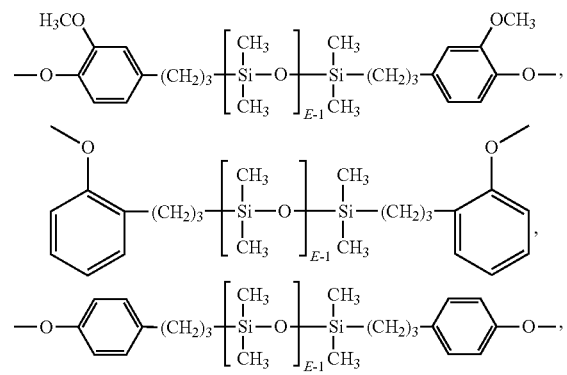

or a combination comprising at least one of the foregoing, wherein E has an average value of 2 to 200;
wherein the poly(carbonate-siloxane) comprises 0.5 to 55 wt. % of siloxane units based on the total weight of the poly(carbonate-siloxane); and
10 wt. % to 35 wt. % of glass fiber; and
0.2 to 5 wt. % of titanium dioxide;
wherein a sample of the polycarbonate composition has a smoke density after 4 minutes (DS-4) of less than or equal to 300 determined according to ISO 5659-2 on a 3 mm thick plaque at 50 kW/m$^2$ and a maximum average heat release (MAHRE) of less than or equal to 90 kW/m$^2$ determined according to ISO 5660-1 on a 3 mm thick plaque at 50 kW/m$^2$.

48. The railway component of claim 47, wherein a sample of the polycarbonate composition has:
- a smoke density after 4 minutes (DS-4) of less than or equal to 150 determined according to ISO 5659-2 on a 3 mm thick plaque at 50 kW/m$^2$, and
- a maximum average heat release (MAHRE) of equal to or less than 60 kW/m$^2$ measured according to ISO 5660-1 on a 3 mm thick plaque at 50 kW/m$^2$.

49. The railway component of claim 1, wherein the component is a seat component, table tray, head rest, privacy divider, center console, arm rest, leg rest, food tray, end bay, shroud, kick panel, foot well, literature pocket, monitor, bezel, line replaceable unit, foot bar, luggage rack, luggage container, luggage compartment, floor and wall composite, air duct, strip, device for passenger information, window frame, interior lining, interior vertical surface, interior door, lining for internal and external door, interior horizontal surface, electrical and lighting component.

50. The railway component of claim 49, wherein the seat component is a primary seat structure, a seat shell, a seat back, or a seat pan.

51. The railway component of claim 49, wherein the interior vertical surface comprises side walls, front walls, end walls, partitions, room dividers, flaps, boxes, hoods and louvres, and the interior horizontal surface comprises ceiling paneling, flaps, boxes, hoods, and louvres.

52. The railway component of claim 1, wherein the component is an extruded or molded interior train cladding.

53. A railway component,
wherein the component is a molded or extruded interior train component comprising a polycarbonate composition comprising:
- a first polycarbonate selected from a linear polycarbonate homopolymer, a branched polycarbonate, a poly(carbonate-bisphenol arylate ester), or a combination comprising at least one of the foregoing;
- a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the composition in an amount of 0.3 to 3 wt. %, based on the total weight of the composition; and
- 10 to 50 wt. % of glass fiber, based on the total weight of the composition;

wherein a sample of the polycarbonate composition has:
- a smoke density after 1.5 min (Ds 1.5) of less than or equal to 100 measured according to ASTM E662-12 in flaming and in non-flaming mode on a 3 mm thick plaque,
- smoke density after 4 min (Ds4) of less than or equal to 200 measured according to ASTM E662-12 in flaming and non-flaming mode on a 3 mm thick plaque, and
- a maximum flame spread index (Is) of 35 and less, without flaming running or dripping measured according to ASTM E162-12a on a 3 mm thick plaque, wherein the component is free of a polyetherimide.

* * * * *